United States Patent
Feng et al.

(10) Patent No.: US 12,437,723 B2
(45) Date of Patent: Oct. 7, 2025

(54) SHIFT REGISTER, GATE DRIVING CIRCUIT, AND DISPLAY APPARATUS

(71) Applicants: Hefei BOE Joint Technology Co., Ltd., Anhui (CN); BOE TECHNOLOGY GROUP CO., LTD., Beijing (CN); Beijing BOE Technology Development Co., Ltd., Beijing (CN)

(72) Inventors: Xuehuan Feng, Beijing (CN); Yongqian Li, Beijing (CN); Xing Yao, Beijing (CN)

(73) Assignees: Hefei BOE Joint Technology Co., Ltd., Anhui (CN); BOE TECHNOLOGY GROUP CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/578,059

(22) PCT Filed: Apr. 28, 2023

(86) PCT No.: PCT/CN2023/091520
§ 371 (c)(1),
(2) Date: Jan. 10, 2024

(87) PCT Pub. No.: WO2024/221392
PCT Pub. Date: Oct. 31, 2024

(65) Prior Publication Data
US 2025/0124877 A1    Apr. 17, 2025

(51) Int. Cl.
*G09G 3/3266* (2016.01)
*G11C 19/28* (2006.01)

(52) U.S. Cl.
CPC ... *G09G 3/3266* (2013.01); *G09G 2310/0286* (2013.01); *G09G 2310/08* (2013.01); *G09G 2320/0214* (2013.01); *G11C 19/28* (2013.01)

(58) Field of Classification Search
CPC ......... G09G 3/3266; G09G 2310/0286; G09G 2310/08; G09G 2320/0214; G09G 3/20; G09G 3/3225; G11C 19/28; G11C 19/00
See application file for complete search history.

(56) References Cited

U.S. PATENT DOCUMENTS

2011/0142191 A1   6/2011   Tobita et al.
2013/0077736 A1   3/2013   Son
(Continued)

FOREIGN PATENT DOCUMENTS

CN   104240657 A   * 12/2014   ............. G11C 19/28
CN   106531117 A     3/2017
(Continued)

*Primary Examiner* — Stephen G Sherman
(74) *Attorney, Agent, or Firm* — HOUTTEMAN LAW, LLC

(57) ABSTRACT

A shift register is provided and includes a display input reset circuit, an inverter circuit, at least one output circuit and a first detection circuit; the display input reset circuit, the inverter circuit and the output circuit are connected to a pull-up node; the inverter circuit and the at least one output circuit are connected to a pull-down node; the first detection circuit is connected to a signal acquisition point, an acquisition control terminal, and a first signal detection line, and configured to acquire a voltage at the signal acquisition point in response to a signal from the acquisition control terminal and output a detection voltage corresponding to the acquired voltage to the first signal detection line, an external first chip adjusts an active level voltage from the third power supply terminal according to the detection voltage; the signal acquisition point includes the pull-down node and/or a signal output terminal.

20 Claims, 26 Drawing Sheets

(56) References Cited

U.S. PATENT DOCUMENTS

| | | | |
|---|---|---|---|
| 2018/0102102 A1 | 4/2018 | Su et al. | |
| 2018/0174545 A1 | 6/2018 | Li | |
| 2021/0209995 A1 | 7/2021 | Feng et al. | |
| 2021/0407422 A1 | 12/2021 | Shi | |
| 2022/0013060 A1* | 1/2022 | Feng | G09G 3/2092 |
| 2022/0092287 A1* | 3/2022 | Shih | G09G 3/36 |
| 2022/0208079 A1* | 6/2022 | Jo | G11C 19/28 |

FOREIGN PATENT DOCUMENTS

| | | | | |
|---|---|---|---|---|
| CN | 106847218 A | | 6/2017 | |
| CN | 108428468 A | | 8/2018 | |
| CN | 108777128 A | | 11/2018 | |
| CN | 109754749 A | | 5/2019 | |
| CN | 109949749 A | | 6/2019 | |
| CN | 110459190 A | * | 11/2019 | G09G 3/3677 |
| CN | 112419953 A | | 2/2021 | |
| CN | 113314181 A | | 8/2021 | |
| CN | 114078550 A | | 2/2022 | |
| JP | 2011198400 A | | 10/2011 | |
| KR | 20180036425 A | | 4/2018 | |
| KR | 20180062099 A | | 6/2018 | |
| KR | 20180066934 A | | 6/2018 | |
| WO | WO-2005081218 A1 | * | 9/2005 | G09G 3/3696 |

\* cited by examiner

SHIFT REGISTER, GATE DRIVING CIRCUIT, AND DISPLAY APPARATUS

TECHNICAL FIELD

The present disclosure relates to the field of display technology, and in particular to a shift register, a gate driving circuit, and a display apparatus.

BACKGROUND

An active matrix organic light-emitting diode (AMOLED) panel is applied more and more widely. A pixel display device of the AMOLED is an organic light-emitting diode (OLED). A thin film transistor is driven to generate a driving current in a saturated state to drive a light-emitting device to emit light, so that the AMOLED can emit light.

SUMMARY

In a first aspect, embodiments of the present disclosure provide a shift register, including: a display input reset circuit, an inverter circuit, at least one output circuit and a first detection circuit, and the display input reset circuit, the inverter circuit and the at least one output circuit are connected to a pull-up node, and the inverter circuit and the at least one output circuit are connected to a pull-down node; the display input reset circuit is connected to a display signal input terminal, a reset signal terminal and a second power supply terminal, and is configured to write an active level signal to the pull-up node in response to a signal provided by the display signal input terminal and to write a voltage provided by the second power supply terminal to the pull-up node in response to a signal provided by the reset signal terminal; the inverter circuit is connected to the second power supply terminal and a third power supply terminal, and is configured to invert a voltage at the pull-up node in response to a voltage provided by the second power supply terminal and an active level voltage provided by the third power supply terminal, and output the inverted voltage to the pull-down node; the at least one output circuit is connected to the pull-up node, the pull-down node, a corresponding signal output terminal, a corresponding output clock signal terminal, and a corresponding fourth power supply terminal, and is configured to write a signal provided by the output clock signal terminal to the corresponding signal output terminal in response to the voltage at the pull-up node, and write a voltage provided by the corresponding fourth power supply terminal to the corresponding signal output terminal in response to the voltage at the pull-up node; and the first detection circuit is connected to a signal acquisition point, an acquisition control terminal, and a first signal detection line, and is configured to acquire a voltage at the signal acquisition point in response to a signal provided by the acquisition control terminal and output a detection voltage corresponding to the voltage at the signal acquisition point to the first signal detection line, so that an external first chip adjusts an active level voltage provided by the third power supply terminal according to the detection voltage; and the signal acquisition point includes at least one of the pull-down node and the signal output terminal.

In some embodiments, the first detection circuit includes: at least one of a first detection sub-circuit and a second detection sub-circuit, the acquisition control terminal includes: a first acquisition control terminal or a second acquisition control terminal; the first detection sub-circuit is connected to the pull-down node, the first acquisition control terminal, and the first signal detection line, and is configured to acquire a voltage at the pull-down node in response to a signal provided by the first acquisition control terminal, and output a first detection voltage corresponding to the voltage at the pull-down node to the first signal detection line; and the second detection sub-circuit is connected to the signal output terminal, the second acquisition control terminal, and the first signal detection line, and is configured to acquire a voltage at the pull-down node in response to a signal provided by the second acquisition control terminal, and output a second detection voltage corresponding to the voltage at the signal output terminal to the first signal detection line.

In some embodiments, the first detection sub-circuit includes: a fifty-first transistor; and a control electrode of the fifty-first transistor is connected to the first acquisition control terminal, a first electrode of the fifty-first transistor is connected to the pull-down node, and a second electrode of the fifty-first transistor is connected to the first signal detection line.

In some embodiments, the first detection sub-circuit includes: a fifty-first transistor, a fifty-second transistor, a fifty-third transistor, and a fifty-fourth transistor; a control electrode of the fifty-first transistor is connected to the first acquisition control terminal, a first electrode of the fifty-first transistor is connected to a second electrode of the fifty-second transistor, and a second electrode of the fifty-first transistor is connected to the first signal detection line; a control electrode of the fifty-second transistor is connected to the pull-down node, and a first electrode of the fifty-second transistor is connected to a second electrode of the fifty-third transistor and a first electrode of the fifty-fourth transistor; a control electrode of the fifty-third transistor is connected to a first switch control terminal, and a first electrode of the fifty-third transistor is connected to the control electrode of the fifty-second transistor; and a control electrode of the fifty-fourth transistor is connected to a second switch control terminal, and a second electrode of the fifty-fourth transistor is connected to a seventh power supply terminal.

In some embodiments, the first detection sub-circuit further includes: a fifty-fifth transistor; the second electrode of the fifty-second transistor is connected to the first electrode of the fifty-first transistor through the fifty-fifth transistor, a control electrode and a first electrode of the fifty-fifth transistor are both connected to the second electrode of the fifty-second transistor, and a second electrode of the fifty-fifth transistor is connected to the first electrode of the fifty-first transistor; or, the second electrode of the fifty-first transistor is connected to the first signal detection line through the fifty-fifth transistor, a control electrode and a first electrode of the fifty-fifth transistor are both connected to the second electrode of the fifty-first transistor, and the second electrode of the fifty-fifth transistor is connected to the first signal detection line.

In some embodiments, the at least one output circuit includes m output circuits, the first detection circuit includes n second detection sub-circuits, the acquisition control terminal includes n second acquisition control terminals, the second detection sub-circuits are in one-to-one correspondence with the second acquisition control terminals, m and n are positive integers, and m≥n; and different second detection sub-circuits correspond to different output circuits, and the second detection sub-circuits are connected to the signal output terminals of the corresponding output circuits.

In some embodiments, each second detection sub-circuit includes: a fifty-sixth transistor; and a control electrode of the fifty-sixth transistor is connected to a corresponding second acquisition control terminal, a first electrode of the fifty-sixth transistor is connected to a corresponding signal output terminal, and a second electrode of the fifty-sixth transistor is connected to the first signal detection line.

In some embodiments, the shift register further includes: a voltage-reducing circuit; and the first detection circuit is connected to the first signal detection line through the voltage-reducing circuit, and the voltage-reducing circuit is configured to perform a voltage-reducing processing on the detection voltage output from the first detection circuit and output the detection voltage subjected to the voltage-reducing processing to the first signal detection line.

In some embodiments, the voltage-reducing circuit includes: a first resistor and a second resistor; and a first terminal of the first resistor is connected to the first detection circuit, a second terminal of the first resistor is connected to the first signal detection line, a first terminal of the second resistor is connected to the second terminal of the first resistor, and a second terminal of the second resistor is connected to a ground terminal.

In some embodiments, the display input reset circuit includes: a display input circuit connected to the display signal input terminal and the pull-up node, and configured to write an active level signal to the pull-up node in response to a signal provided by the display signal input terminal; a display reset circuit connected to a display reset signal input terminal, the second power supply terminal and the pull-up node, and configured to write a voltage provided by the second power supply terminal to the pull-up node in response to a signal provided by the display reset signal input terminal; the shift register further includes: a first voltage control circuit; the first voltage control circuit is connected to a first power supply terminal, the pull-up node and a first voltage control node, and is configured to write a voltage provided by the first power supply terminal to the first voltage control node in response to the voltage at the pull-up node; the shift register further includes: at least one of a second leakage preventing circuit and a display input leakage preventing circuit; the display reset circuit is connected to the second power supply terminal through the second leakage preventing circuit; the display reset circuit and the second leakage preventing circuit are connected to each other at a second leakage preventing node; the second leakage preventing node is connected to the first voltage control node; the second leakage preventing circuit is connected to the display reset signal input terminal, and is configured to form a conductive path between the second leakage preventing node and the second power supply terminal in response to an active level signal provided by the display reset signal input terminal, and to electrically disconnect the second leakage preventing node from the second power supply terminal in response to a non-active level signal provided by the display reset signal input terminal; and the display input circuit is connected to the pull-up node through the display input leakage preventing circuit; the display input circuit is connected to the display input leakage preventing circuit at a display input leakage preventing node; the display input leakage preventing node is connected to the first voltage control node; the display input leakage preventing circuit is connected to the display signal input terminal, and is configured to form a conductive path between the display input leakage preventing node and the pull-up node in response to an active level signal provided by the display signal input terminal, and to electrically disconnect the display input leakage preventing node from the pull-up node in response to a non-active level signal provided by the display signal input terminal.

In some embodiments, the shift register further includes: at least one of a pull-up noise reduction circuit and a global reset circuit; the pull-up noise reduction circuit is connected to the second power supply terminal, the pull-up node and the pull-down node, and is configured to write a voltage provided by the second power supply terminal to the pull-up node in response to an active level signal at the pull-down node; and the global reset circuit is connected to a global reset signal input terminal, the second power supply terminal and the pull-up node, and is configured to write a voltage provided by the second power supply terminal to the pull-up node in response to a signal provided by the global reset signal input terminal.

In some embodiments, the shift register further includes: a first voltage control circuit; the first voltage control circuit is connected to the first power supply terminal, the pull-up node and the first voltage control node, and is configured to write a voltage provided by the first power supply terminal to the first voltage control node in response to a voltage at the pull-up node and; the shift register circuit further includes: at least one of a first leakage preventing circuit and a third leakage preventing circuit; the global reset circuit is connected to the second power supply terminal through the first leakage preventing circuit; the global reset circuit is connected to the first leakage preventing circuit at a first leakage preventing node; the first leakage preventing node is connected to the first voltage control node; the first leakage preventing circuit is connected to the global reset signal input terminal, and is configured to form a conductive path between the first leakage preventing node and the second power supply terminal in response to an active level signal provided by the global reset signal input terminal, and electrically disconnect the first leakage preventing node from the second power supply terminal in response to a non-active level signal provided by the global reset signal input terminal; and the pull-up noise reduction circuit is connected to the second power supply terminal through the third leakage preventing circuit; the pull-up noise reduction circuit is connected to the third leakage preventing circuit at a third leakage preventing node; the third leakage preventing node is connected to the first voltage control node; the third leakage preventing circuit is connected to the pull-down node, and is configured to form a conductive path between the third leakage preventing node and the second power supply terminal in response an active level signal at the pull-down node, and to electrically disconnect the third leakage preventing node from the second power supply terminal in response to a non-active level signal at the pull-down node.

In some embodiments, the shift register further includes: a second detection circuit connected to the first voltage control node, a third acquisition control terminal and a second signal detection line, and configured to acquire a voltage at the first voltage control node in response to a signal provided by the third acquisition control terminal and output a third detection voltage corresponding to the voltage at the first voltage control node to the second signal detection line for the external first chip to adjust a voltage provided by the first power supply terminal according to the third detection voltage.

In some embodiments, the second detection circuit includes: a fifty-seventh transistor; and a control electrode of the fifty-seventh transistor is connected to the third acquisition control terminal, a first electrode of the fifty-seventh transistor is connected to the first voltage control node, and a second electrode of the fifty-seventh transistor is connected to the second signal detection line.

In some embodiments, the first signal detection line is multiplexed as the second signal detection line.

In some embodiments, the inverter circuit includes: a thirty-seventh transistor, a thirty-eighth transistor, a thirty-ninth transistor, and a fortieth transistor; a control electrode of the thirty-seventh transistor is connected to the third power supply terminal, a first electrode of the thirty-seventh transistor is connected to the control electrode of the thirty-seventh transistor, and a second electrode of the thirty-seventh transistor is connected to a control electrode of the thirty-eighth transistor; the control electrode of the thirty-eighth transistor is connected to a first electrode of the fortieth transistor, a first electrode of the thirty-eighth transistor is connected to the third power supply terminal, and a second electrode of the thirty-eighth transistor is connected to the pull-down node; a control electrode of the thirty-ninth transistor is connected to the pull-up node, a first electrode of the thirty-ninth transistor is connected to the pull-down node, and a second electrode of the thirty-ninth transistor is connected to the second power supply terminal; and a control electrode of the fortieth transistor is connected to the pull-up node, and a second electrode of the fortieth transistor is connected to a fifth power supply terminal or a pull-down node.

In some embodiments, the inverter circuit further includes: a forty-first transistor; the second electrode of the thirty-seventh transistor is connected to the control electrode of the thirty-eighth transistor through the forty-first transistor; and a control electrode of the forty-first transistor is connected to the control electrode of the thirty-seventh transistor, a first electrode of the forty-first transistor is connected to the second electrode of the thirty-seventh transistor, and a second electrode of the forty-first transistor is connected to the control electrode of the thirty-eighth transistor.

In some embodiments, the inverter circuit includes: a twelfth transistor and a thirteenth transistor; a control electrode of the twelfth transistor is connected to the third power supply terminal, a first electrode of the twelfth transistor is connected to the control electrode of the twelfth transistor, and a second electrode of the twelfth transistor is connected to the pull-down node; and a control electrode of the thirteenth transistor is connected to the pull-up node, a first electrode of the thirteenth transistor is connected to the pull-down node, and a second electrode of the thirteenth transistor is connected to the second power supply terminal.

In some embodiments, the shift register further includes: a sensing control circuit connected to a sensing control node, a sensing signal input terminal and a random signal input terminal, and configured to write a signal provided by the sensing signal input terminal to the sensing control node in response to a signal provided by the random signal input terminal; and a sensing input circuit connected to the sensing control node, a clock control signal input terminal, a sensing intermediate node and the pull-up node, and configured to write an active level signal to the sensing intermediate node in response to an active level signal at the sensing control node and to form a conductive path between the sensing intermediate node and the pull-up node in response to a signal provided by the clock control signal input terminal.

In a second aspect, embodiments of the present disclosure provide a gate driving circuit, including: a plurality of cascaded shift registers, and at least one of the shift registers is the shift register as provided in the first aspect.

In some embodiments, the plurality of cascaded shift registers include: a plurality of active shift registers for providing driving signals to gate lines in a display region and at least one dummy shift register other than the plurality of active shift registers; and each of the at least one dummy shift register is the shift register as provided in the first aspect.

In a third aspect, embodiments of the present disclosure provide a display apparatus, including: a display region and a non-display region surrounding the display region, the non-display region is provided with the gate driving circuit as provided in the second aspect.

In some embodiments, the display apparatus further includes: a plurality of pixel units arranged in an array and a plurality of signal reading lines; each pixel unit includes: a pixel driving circuit having an external threshold compensation function; the pixel driving circuit includes: a driving transistor and a sensing switch circuit; and the sensing switch circuit is connected to a second electrode of the driving transistor and a corresponding signal reading line, and is configured to read an electrical signal at the second electrode of the driving transistor to the corresponding signal reading line, so that an external second chip performs an external threshold compensation processing on the driving transistor according to the electrical signal at the second electrode of the driving transistor; and at least one signal reading line is multiplexed as the first signal detection line.

In some embodiments, the second chip is a same chip as the first chip.

In some embodiments, only one shift register in the gate driving circuit is provided with the first detection circuit; and one signal reading line closest to the gate driving circuit in the display apparatus is multiplexed as the first signal detection line.

In some embodiments, the first chip is further configured to control a voltage provided by the third power supply terminal to be switched from an active level voltage to a non-active level voltage in response to the display apparatus being switched to being in an OFF state.

In some embodiments, the first chip includes: an analog-to-digital conversion module and a voltage adjustment module; the analog-to-digital conversion module is connected to the first signal detection line, and is configured to perform an analog-to-digital conversion processing on a signal from the first signal detection line to obtain a corresponding digital voltage; and the voltage adjustment module is connected to the analog-to-digital conversion module, and is configured to determine a magnitude of an active level voltage to be provided to the third power supply terminal according to a preset adjustment algorithm and the digital voltage provided by the analog-to-digital conversion module.

In some embodiments, the first chip further includes: a power supply module connected to the voltage adjustment module, and configured to output a corresponding active level voltage to the third power supply terminal according to the magnitude of the active level voltage to be provided to the third power supply terminal determined by the voltage adjustment module In some embodiments, the display apparatus further includes: a switch circuit between the first chip and the first signal detection line.

In some embodiments, the first signal detection line is further provided with an eleventh capacitor; and a first terminal of the eleventh capacitor is connected to the first signal detection line, and a second terminal of the eleventh capacitor is connected to the ground terminal.

DETAIL DESCRIPTION OF EMBODIMENTS

In order to enable one of ordinary skill in the art to better understand the technical solutions of the present disclosure, a shift register, a gate driving circuit, and a display apparatus provided by the present disclosure will be described in further detail with reference to the accompanying drawings.

The terms "first", "second" and the like used in embodiments of the present disclosure are not intended to indicate any order, quantity, or importance, but rather are used for distinguishing one element from another. The term "comprising", "including", or the like means that the element or item preceding the term contains the element or item listed after the term and its equivalent, but does not exclude other elements or items. The term "connected", "coupled" or the like is not limited to physical or mechanical connections, but may include electrical connections, whether direct or indirect connections.

A transistor in the embodiments of the present disclosure may be a thin film transistor, a field effect transistor or any other device having the same characteristics. In the embodiments, a drain electrode and a source electrode of each transistor may be interchangeable, and therefore there is no difference between the drain electrode and the source electrode of the transistor in the embodiments of the present disclosure. Herein, only in order to distinguish the two electrodes of the transistor except for a control electrode (i.e., a gate electrode), one of the electrodes is referred to as a drain electrode, and the other electrode is referred to as a source electrode. The thin film transistors in the embodiments of the present disclosure may be N-type transistors or P-type transistors. In the embodiments of the present disclosure, when an N-type thin film transistor is used, a first electrode thereof may be a source electrode, and a second electrode thereof may be a drain electrode.

In the present disclosure, an "active level voltage" refers to a voltage that can control a transistor to be turned on after input to a control electrode of the transistor, and a "non-active level signal" refers to a signal that can control a transistor to be turned off after input to a control electrode of the transistor. For an N-type transistor, a high level signal is an active level signal, and a low level signal is a non-active level signal; for a P-type transistor, a low level signal is an active level signal and a high level signal is a non-active level signal.

In the following description, a case where the transistor is an N-type transistor will be described as an example, and an active level voltage refers to a high level voltage and a non-active level voltage refers to a low level voltage. It is conceivable that when a P-type transistor is employed, the timing of the control voltage needs to be adjusted accordingly. Specific details are not set forth herein but are to be understood as being within the scope of the present disclosure.

Figure 1:
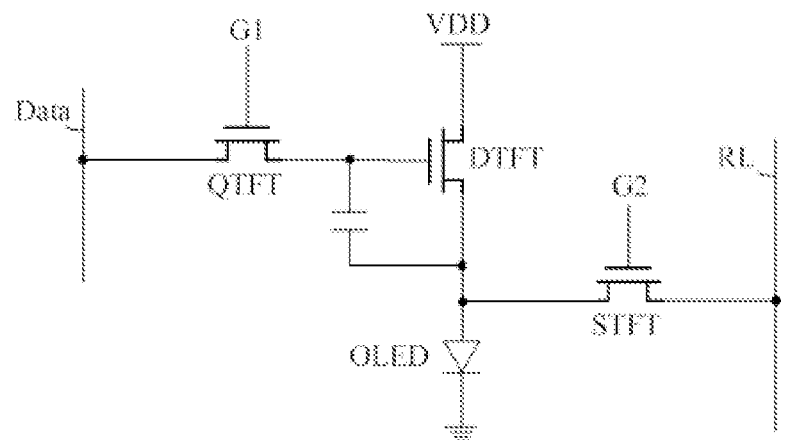
FIG. 1 is a schematic diagram of a circuit structure of a pixel circuit in an organic light-emitting diode display panel.
Figure 2:
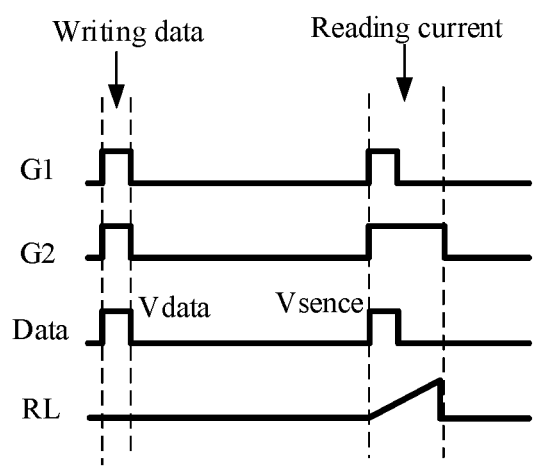
FIG. 2 is a timing diagram illustrating an operation of the pixel circuit shown in FIG. 1.

FIG. 1 is a schematic diagram of a circuit structure of a pixel circuit in an organic light-emitting diode display panel; FIG. 2 is a timing diagram illustrating an operation of the pixel circuit shown in FIG. 1. As shown in FIGS. 1 and 2, for an organic light-emitting diode display panel with an external compensation function, one frame of picture may be divided into two phases: a display driving phase and a sensing driving phase; in the display driving phase, the display driving is completed for pixel units in rows in the display panel; in the sensing driving phase, the current drawing (i.e., the sensing) is completed for pixel units in a row in the display panel.

Referring to FIG. 1, the pixel circuit includes a display switching transistor QTFT (a control electrode of the display switching transistor QTFT is connected to a first gate line G1), a driving transistor DTFT, a sensing switching transistor STFT (a control electrode of the sensing switching transistor STFT is connected to a second gate line G2), and a capacitor Cst. When the external compensation is needed to be carried out on the pixel circuit, an operating process of the pixel circuit at least includes the following two phases: the display driving phase (including a data voltage writing process) and the sensing driving phase (including a current reading process).

In the display driving phase, it is necessary to write a data voltage Vdata in a data line Data to the pixel units; in the sensing driving phase, it is necessary to write a test voltage Vsence to the pixel units through the data line Data, and read an electrical signal at a drain electrode of the driving transistor to a signal reading line RL through the sensing switching transistor STFT. In the current reading process, it is necessary to write an active level voltage to a gate electrode of the sensing switching transistor STFT through the corresponding second gate line G2. It should be noted that the specific compensation process and the specific compensation principle for performing the external compensation on the pixel units in the OLED display panel are not described herein again.

For the first gate line G1 for controlling the display switching transistor QTFT and the second gate line G2 for controlling the sensing switching transistor STFT, corresponding gate driving circuits are respectively provided in a peripheral region of the display panel, and each gate driving circuit includes a plurality of cascaded shift register units, and driving signals may be provided to the corresponding gate line through the shift register units.

Figure 3:
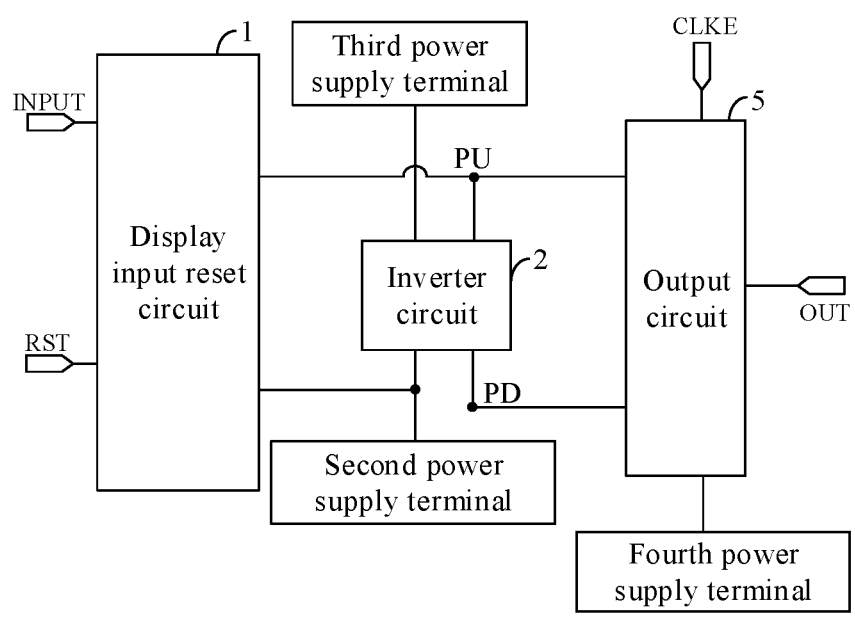
FIG. 3 is a schematic diagram of a circuit structure of a shift register in the related art.

FIG. 3 is a schematic diagram of a circuit structure of a shift register in the related art. As shown in FIG. 3, the shift register includes a display input reset circuit 1, an inverter circuit 2, and at least one output circuit 5 (only one output circuit 5 is exemplarily shown in FIG. 1), where each output circuit 5 includes an output transistor and a pull-down transistor, a control electrode of the output transistor is connected to a pull-up node PU, and a control electrode of the pull-down transistor is connected to a pull-down node PD. The inverter circuit 2 is connected to a second power supply terminal and a third power supply terminal, and is configured to invert a voltage at the pull-up node PU in response to a non-active level voltage provided by the second power supply terminal and an active level voltage provided by the third power supply terminal, and output the inverted voltage to the pull-down node PD.

In practical applications, it is found that a period in which a voltage at the pull-down node PD is at a high level is much greater than that in which the voltage at the pull-down node PD is at a low level. That is, the voltage at the pull-down node PD is at the high level for a long time, which may cause a threshold voltage of the pull-down transistor to drift forward (the threshold voltage gradually increases).

In addition, a high level voltage at the pull-down node PD is provided by the inverter circuit 2, and is related to a high level voltage (active level voltage) provided by the third power supply terminal to which the inverter circuit 2 is connected. A transistor of the inverter circuit 2 may also drift forward as a control electrode of the transistor is connected to the third power supply terminal and is continuously at the high level, which may also cause the voltage written to the pull-down node PD by the inverter circuit 2 to gradually decrease.

Therefore, in the related art, as the use time increases, the high level voltage output by the inverter circuit 2 to the pull-down node PD gradually decreases, and the threshold voltage of the pull-down transistor in the output circuit 5 gradually increases, so that there is a risk that the high level voltage output by the inverter circuit 2 to the pull-down node PD cannot control the pull-down transistor to be turned on, which results in a decrease in reliability of the shift register.

In order to effectively solve at least one technical problem existing in the related art, embodiments of the present disclosure provide a shift register.

Figure 4A:
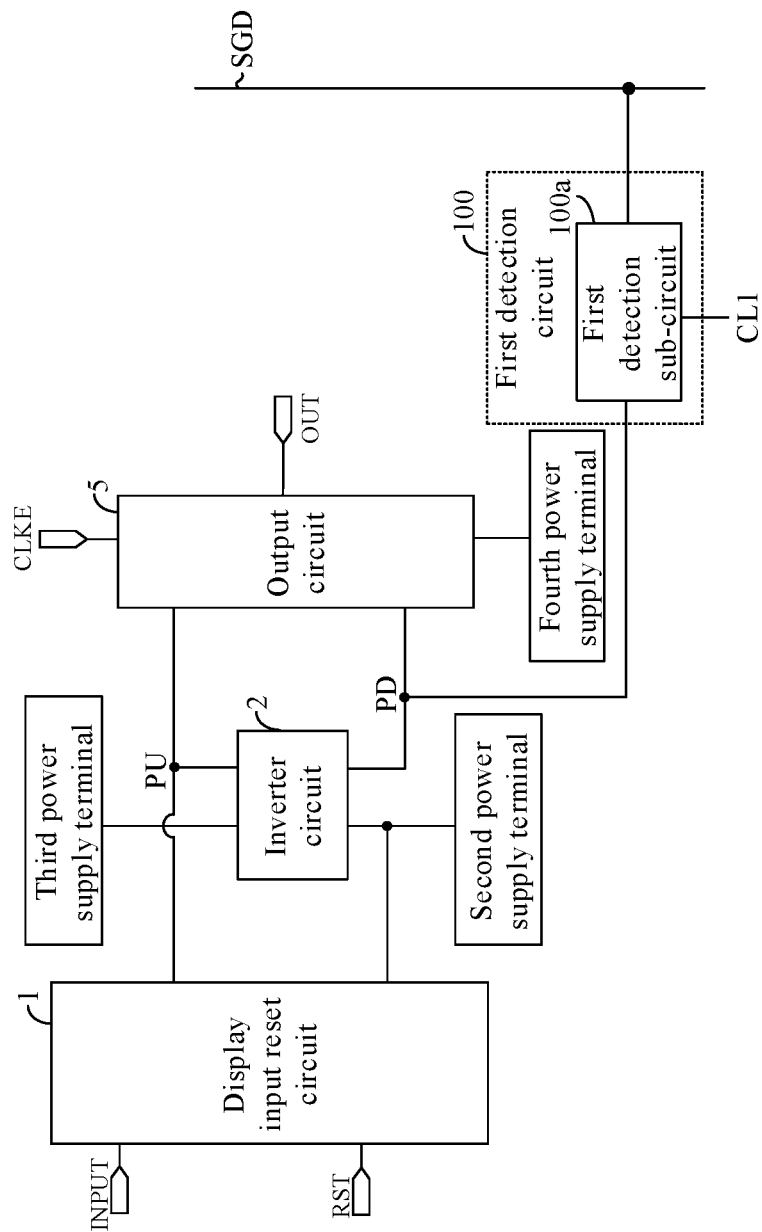
FIG. 4A is a schematic diagram of a circuit structure of a shift register according to embodiments of the present disclosure.
Figure 4B:
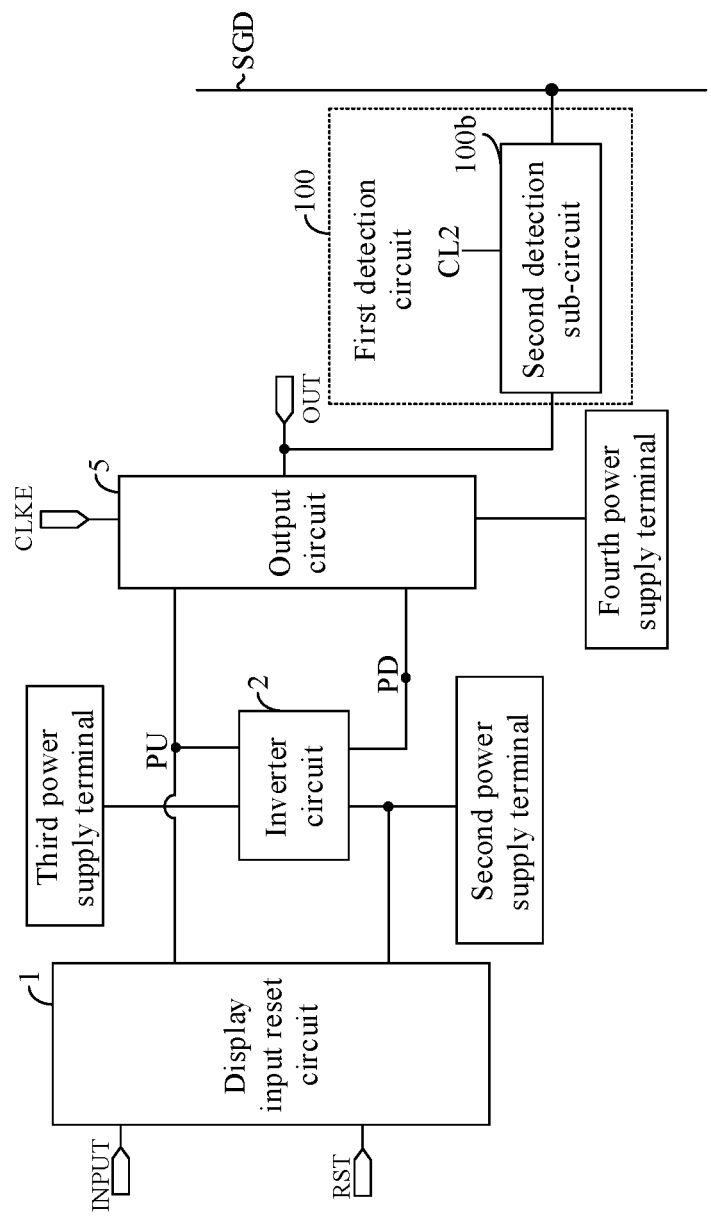
FIG. 4B is a schematic diagram of another circuit structure of a shift register according to embodiments of the present disclosure.
Figure 4C:
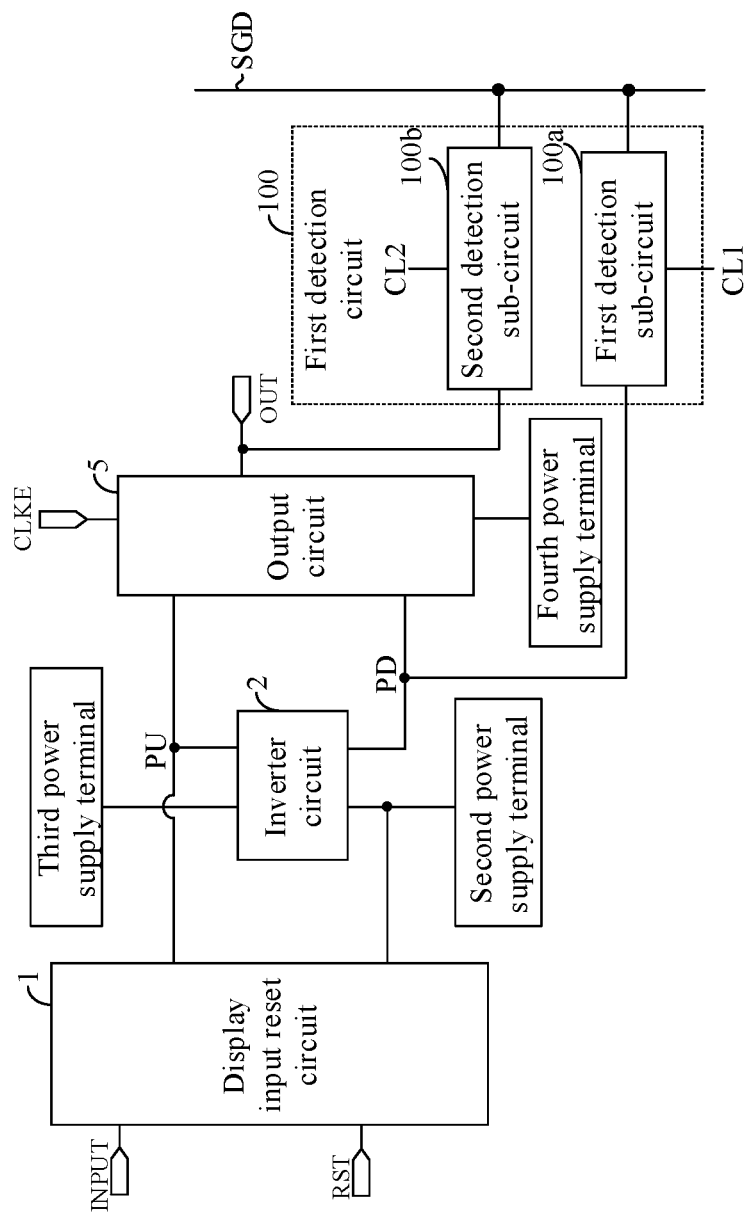
FIG. 4C is a schematic diagram of another circuit structure of a shift register according to embodiments of the present disclosure.

FIG. 4A is a schematic diagram of a circuit structure of a shift register according to embodiments of the present disclosure; FIG. 4B is a schematic diagram of another circuit structure of a shift register according to embodiments of the present disclosure; FIG. 4C is a schematic diagram of another circuit structure of a shift register according to embodiments of the present disclosure. As shown in FIGS. 4A to 4C, the shift register includes: a display input reset circuit 1, an inverter circuit 2, at least one output circuit 5 and a first detection circuit 100, and the display input reset circuit 1, the inverter circuit 2 and the at least one output circuit 5 are connected to a pull-up node PU, and the inverter circuit 2 and the at least one output circuit 5 are connected to a pull-down node PD.

The display input reset circuit 1 is connected to a display signal input terminal INPUT, a reset signal terminal RST and the second power supply terminal, and is configured to write an active level signal to the pull-up node PU in response to a signal provided by the display signal input terminal INPUT and to write a voltage provided by the second power supply terminal to the pull-up node PU in response to a signal provided by the reset signal terminal RST.

The inverter circuit 2 is connected to the second power supply terminal and the third power supply terminal, and is configured to invert the voltage at the pull-up node PU in response to a non-active level voltage provided by the second power supply terminal and an active level voltage provided by the third power supply terminal, and output the inverted voltage to the pull-down node PD.

The output circuit 5 is connected to the pull-up node PU, the pull-down node PD, a corresponding signal output terminal OUT, a corresponding output clock signal terminal CLKE, and a corresponding fourth power supply terminal, and is configured to write a signal provided by the output clock signal terminal CLKE to the corresponding signal output terminal OUT in response to the voltage at the pull-up node PU, and write a voltage provided by the corresponding fourth power supply terminal to the corresponding signal output terminal OUT in response to the voltage at the pull-up node PU.

The first detection circuit 100 is connected to a signal acquisition point, an acquisition control terminal, and a first signal detection line SGD, and is configured to acquire a voltage at the signal acquisition point in response to a signal provided by the acquisition control terminal and output a detection voltage corresponding to the voltage at the signal acquisition point to the first signal detection line SGD, so that an external first chip adjusts an active level voltage provided by the third power supply terminal according to the detection voltage; and the signal acquisition point includes at least one of the pull-down node PD and the signal output terminal OUT.

In the embodiments of the present disclosure, the active level voltage actually output by the inverter circuit 2 to the pull-down node PD may reflect a threshold voltage drift of the transistor with the control electrode connected to the third power supply terminal in the inverter circuit 2. When the voltage at the pull-up node PU is the active level voltage and the fourth power supply terminal provides an active level voltage, a voltage output by the signal output terminal OUT may reflect an overall drift of a threshold voltage of the transistor with the control electrode connected to the third power supply terminal in the inverter circuit 2 and a threshold voltage of the pull-down transistor in the output circuit 5.

Therefore, in the present disclosure, the first detection circuit 100 is provided to detect the active level voltage at the pull-down node PD and/or the signal output terminal OUT, and output a corresponding detection voltage; and the external first chip connected to the first signal detection line SGD may adjust (increase) the active level voltage provided by the third power supply terminal according to the detection voltage, so that the active level voltage output by the inverter circuit 2 to the pull-down node PD is always higher than the threshold voltage of the pull-down transistor. Thus, it can ensure that the pull-down transistor can be always in an ON state when the inverter circuit 2 outputs the active level voltage to the pull-down node PD, and the reliability of the shift register can be further improved.

In some embodiments, the first detection circuit 100 includes: at least one of a first detection sub-circuit 100a and a second detection sub-circuit 100b; the acquisition control terminal includes: a first acquisition control terminal CL1 or a second acquisition control terminal CL2.

The first detection sub-circuit 100a is connected to the pull-down node PD, the first acquisition control terminal CL1, and the first signal detection line SGD, and is configured to acquire a voltage at the pull-down node PD in response to a signal provided by the first acquisition control terminal CL1 and output a first detection voltage corresponding to the voltage at the pull-down node PD to the first signal detection line SGD.

The second detection sub-circuit 100b is connected to the signal output terminal OUT, the second acquisition control terminal CL2, and the first signal detection line SGD, and is configured to acquire a voltage at the signal output terminal OUT in response to a signal provided by the second acquisition control terminal CL2 and output a second detection voltage corresponding to the voltage at the signal output terminal OUT to the first signal detection line SGD.

FIG. 4A illustrates that the first detection circuit 100 includes only the first detection sub-circuit 100a, FIG. 4B illustrates that the first detection circuit 100 includes only the second detection sub-circuit 100b, and FIG. 4C illustrates that the first detection circuit 100 includes both the first detection sub-circuit 100a and the second detection sub-circuit 100b.

In the present disclosure, a process of detecting the active level voltage at the pull-down node PD by using the first detection sub-circuit 100a is as follows: an active level signal is provided to the reset signal terminal RST to cause the display input reset circuit 1 to write a non-active level voltage provided by the second power supply terminal to the pull-up node PU; where under the action of the inverter circuit 2, the inverter circuit 2 outputs an active level voltage to the pull-down node PD according to an active level voltage provided by the third power supply terminal; and an active level signal is provided to the first acquisition control terminal CL1 to cause the first detection sub-circuit 100a to acquire the active level voltage at the pull-down node PD and output the first detection voltage corresponding to the voltage at the pull-down node PD to the first signal detection line SGD. In the embodiments of the present disclosure, the first detection voltage output from the first detection sub-circuit 100a to the first signal detection line SGD may be equal to or unequal to the active level voltage at the pull-down node PD (in case of inequality, it is only necessary to ensure that the first detection voltage and the active level voltage satisfy a certain preset relationship), which will be described in detail below.

In the present disclosure, a process of detecting the active level voltage at the signal output terminal OUT by using the second detection sub-circuit 100b is as follows: an active level signal is provided to the reset signal terminal RST to cause the display input reset circuit 1 to write a non-active level voltage provided by the second power supply terminal to the pull-up node PU; where under the action of the inverter circuit 2, the inverter circuit 2 outputs an active level voltage to the pull-down node PD according to an active level voltage provided by the third power supply terminal; and an active level signal is provided to the first acquisition control terminal CL1, and an active level voltage is provided to the fourth power supply terminal corresponding to the output circuit 5 to which the second detection sub-circuit 100b is connected, to cause the second detection sub-circuit 100b to acquire the active level voltage at the connected signal output terminal OUT and output the second detection voltage corresponding to the active level voltage at the signal output terminal OUT to the first signal detection line SGD. In the embodiments of the present disclosure, the second detection voltage output from the second detection sub-circuit 100b to the first signal detection line SGD may be equal to or unequal to the active level voltage at the signal output terminal OUT (in case of inequality, it is only necessary to ensure that the second detection voltage and the active level voltage satisfy a certain preset relationship), which will be described in detail below.

Figure 5:
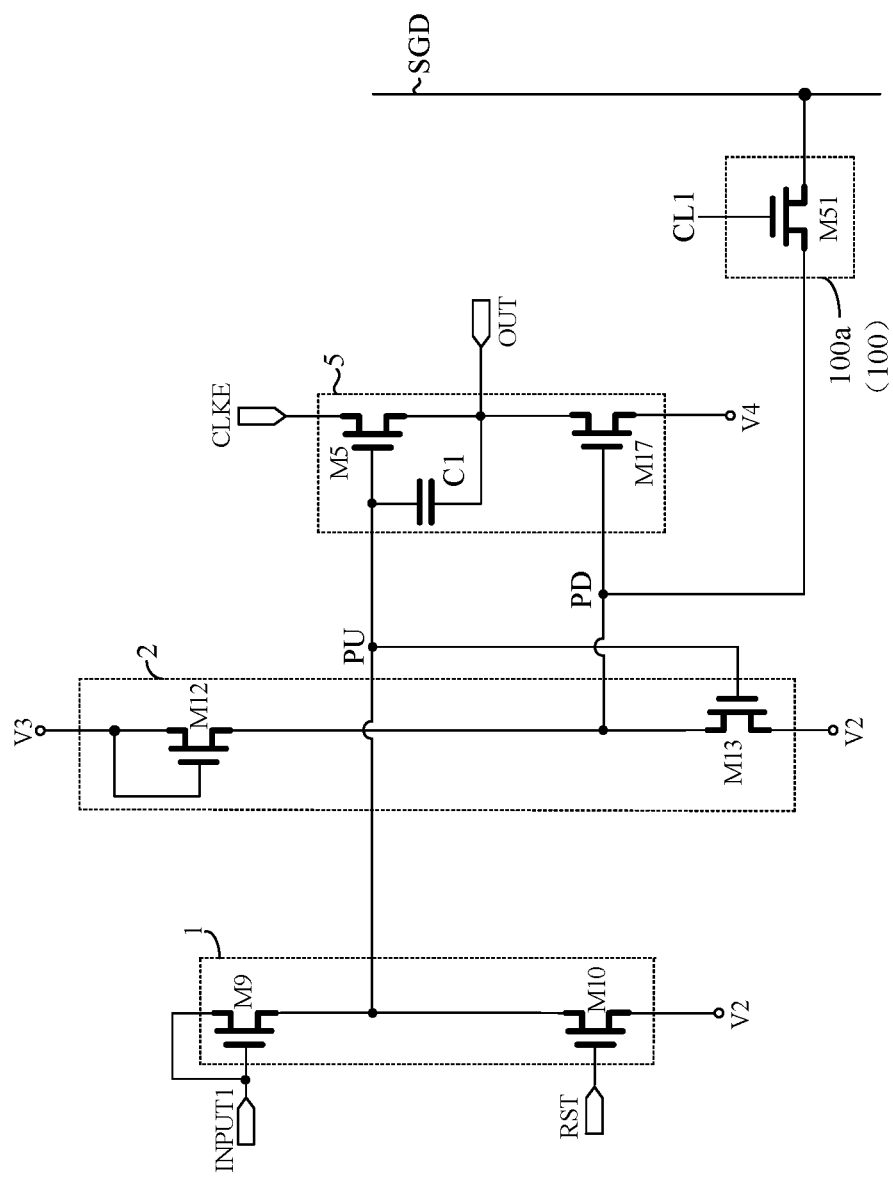
FIG. 5 is a schematic diagram of another circuit structure of a shift register according to embodiments of the present disclosure.
Figure 6:
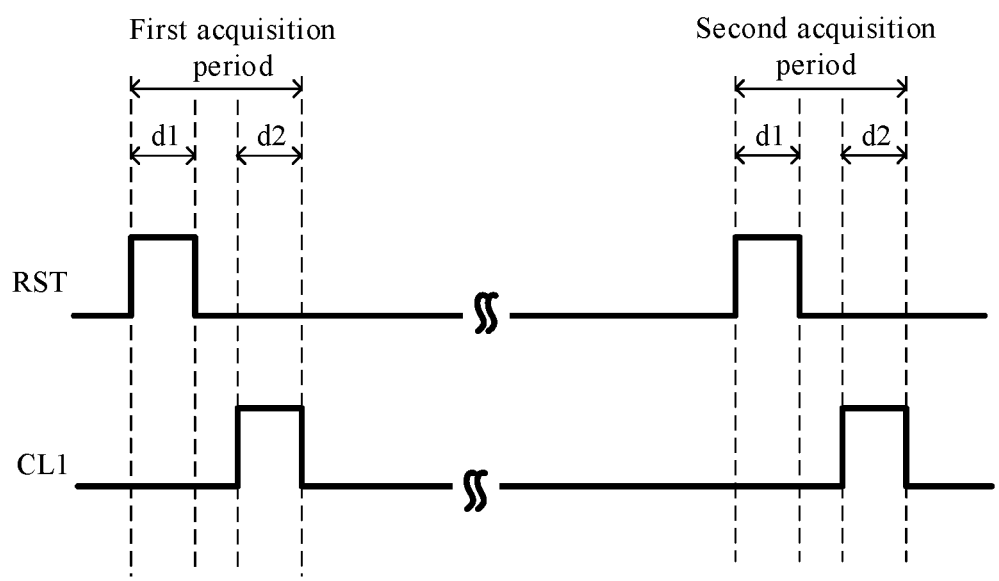
FIG. 6 is a timing diagram illustrating an operation of a first detection circuit in the shift register shown in FIG. 5 during a voltage acquisition process.

FIG. 5 is a schematic diagram of another circuit structure of a shift register according to embodiments of the present disclosure; FIG. 6 is a timing diagram illustrating an operation of a first detection circuit 100 in the shift register shown in FIG. 5 during a voltage acquisition process. As shown in FIGS. 5 and 6, the shift register is a specific optional implementation of the shift register as shown in FIG. 4A. In some embodiments, the display input reset circuit 1 includes: a ninth transistor M9 and a tenth transistor M10, the inverter circuit 2 includes: a twelfth transistor M12 and a thirteenth transistor M13, the output circuit 5 includes: a fifth transistor M5 and a seventeenth transistor M17, and some output circuits 5 each may further include a first capacitor C1 therein.

A control electrode and a first electrode of the ninth transistor M9 are both connected to the display signal input terminal INPUT1, and a second electrode of the ninth transistor M9 is connected to the pull-up node PU.

A control electrode of the tenth transistor M10 is connected to the display reset signal input terminal RST, a first electrode of the tenth transistor M10 is connected to the pull-up node PU, and a second electrode of the tenth transistor M10 is connected to the second power supply terminal.

A control electrode of the twelfth transistor M12 is connected to the third power supply terminal, a first electrode of the twelfth transistor M12 is connected to the control electrode of the twelfth transistor M12, and a second electrode of the twelfth transistor M12 is connected to the pull-down node PD.

A control electrode of the thirteenth transistor M13 is connected to the pull-up node PU, a first electrode of the thirteenth transistor M13 is connected to the pull-down node PD, and a second electrode of the thirteenth transistor M13 is connected to the second power supply terminal.

A control electrode of the fifth transistor M5 is connected to the pull-up node PU, a first electrode of the fifth transistor M5 is connected to the corresponding output clock signal terminal CLKE, and a second electrode of the fifth transistor M5 is connected to the corresponding signal output terminal OUT.

A control electrode of the seventeenth transistor M17 is connected to the pull-down node PD, a first electrode of the seventeenth transistor M17 is connected to the corresponding signal output terminal OUT, and a second electrode of the seventeenth transistor M17 is connected to the corresponding fourth power supply terminal.

A first terminal of the first capacitor C1 is connected to the pull-up node PU, and a second terminal of the first capacitor C1 is connected to the corresponding signal output terminal OUT.

It should be noted that the specific circuit structures of the display input reset circuit 1, the inverter circuit 2 and the output circuit 5 illustrated above are only one optional embodiment in the present disclosure, and do not limit the technical solutions of the present disclosure.

In some embodiments, the first detection sub-circuit 100a includes: a fifty-first transistor M51; a control electrode of the fifty-first transistor M51 is connected to the first acquisition control terminal CL1, a first electrode of the fifty-first transistor M51 is connected to the pull-down node PD, and a second electrode of the fifty-first transistor M51 is connected to the first signal detection line SGD.

The detection process of the first detection sub-circuit 100a and the principle of adjusting the active level voltage output from the third power supply terminal based on the first detection voltage in the first signal detection line SGD will be described in detail below with reference to specific examples.

The second power supply terminal provides a voltage V2 as a low level voltage, the third power supply terminal provides a voltage V3 as a high level voltage, the fourth power supply terminal provides a voltage V4 as a high level voltage, and the high level voltage V4 is equal to or greater than the high level voltage V3.

Referring to FIG. 6, a first acquisition period (i.e., a period in which the gate driving circuit is not required to drive the display apparatus, such as a blanking period when the display apparatus has been powered on and before displaying a first frame of picture, or a blanking period between two adjacent frames of pictures) includes: a first sub-phase d1 and a second sub-phase d2.

In the first sub-phase d1, the reset signal input terminal RST provides a high level signal, and the first acquisition control terminal CL1 provides a low level signal. Thus, the tenth transistor M10 is turned on, and the fifty-first transistor M51 is turned off. A low level voltage provided by the second power supply terminal is written to the pull-up node PU, and the pull-up node PU is at a low level; accordingly, the thirteenth transistor M13 is turned off, and a high level voltage provided by the third power supply terminal is written to the pull-down node PD through the twelfth transistor M12, where the voltage actually written to the pull-down node PD is V3–Vth_M12, where Vth_M12 is a threshold voltage of the twelfth transistor M12 in the first acquisition period. Accordingly, the seventeenth transistor M17 is turned on, the fourth power supply terminal charges the signal output terminal OUT; when a voltage at the signal output terminal OUT is charged to V3–Vth_M12–Vth_M17, a gate-source voltage of the seventeenth transistor M17 is equal to a current threshold voltage Vth_M17 of the seventeenth transistor M17, and the seventeenth transistor M17 is switched to being in an OFF state.

In the second sub-phase d2, the first acquisition control terminal CL1 provides a high level signal, and thus, the fifty-first transistor M51 is turned on, and the voltage at the pull-down node PD is written to the first signal detection line SGD through the fifty-first transistor M51. That is, the first detection voltage acquired through the first signal detection line SGD is Vdtc11=V3–Vth_M12.

After a period of time (which may be preset according to actual conditions), the process enters a second acquisition period (i.e., a period in which the gate driving circuit is not required to drive the display apparatus, such as a blanking period when the display apparatus has been powered on and before displaying a first frame of picture, or a blanking period between two adjacent frames of pictures), which also includes two sub-phases: a first sub-phase d1 and a second sub-phase d2. The specific process is the same as the process of the first acquisition period, and is not described herein again. In the second sub-phase d2 of the second acquisition period, the first detection voltage acquired by the first signal detection line SGD is Vdtc12=V3–Vth_M12', and Vth_M12' is a threshold voltage of the twelfth transistor M12 in the second acquisition period. Generally, the threshold voltage of the twelfth transistor M12 is drifted forward by a high level voltage V3, i.e., Vth_M12'>Vth_M12.

In the embodiments of the present disclosure, the external first chip may obtain the threshold voltage drift of the twelfth transistor M12 by comparing the first detection voltage Vdtc11 acquired in the first acquisition period with the first detection voltage Vdtc12 acquired in the second acquisition period. For example, a drift amount ΔVth_M12 of the threshold voltage of the twelfth transistor M12 in a period from the first acquisition period to the second acquisition period may be obtained through a difference Vdtc11–Vdtc12 between the two first detection voltages, ΔVth_M12=Vth_M12'–Vth_M12=Vdtc11–Vdtc12.

At this time, the active level voltage provided by the third power supply terminal may be adjusted according to the threshold voltage drift of the twelfth transistor M12.

As an example, an active level voltage V3' provided by the adjusted third power supply terminal is:

$$V3' = V3 + 2 \times \Delta Vth\_M12 = V3 + 2 \times (Vdtc11 - Vdtc12);$$

In practical applications, it is found that the threshold voltage drift of the seventeenth transistor M17 is substantially the same as that of the twelfth transistor M12, that is, the drift amount ΔVth_M12 of the threshold voltage of the twelfth transistor M12 in a period from the first acquisition period to the second acquisition period is equal or approximately equal to the drift amount ΔVth_M17 of the threshold voltage of the seventeenth transistor M17 in the period from the first acquisition period to the second acquisition period. The threshold voltage of the seventeenth transistor M17 in the first acquisition period is denoted as Vth_M17, the threshold voltage of the seventeenth transistor M17 in the second acquisition period is denoted as Vth_M17', and ΔVth_M17=Vth_M17'−Vth_M17~ΔVth_M12.

In the first acquisition period, a difference between a voltage at the control electrode of the seventeenth transistor M17 (a voltage at the pull-down node PD) and the threshold voltage of the seventeenth transistor M17 is V3−Vth_M12−Vth_M17. After the threshold voltage of the twelfth transistor M12 drifts to Vth_M12' and the threshold voltage of the seventeenth transistor M17 drifts to Vth_M17', in order to ensure that the seventeenth transistor M17 is still turned on normally, the difference between the voltage at the control electrode of the seventeenth transistor M17 (i.e., V3'−Vth_M12') and the threshold voltage of the seventeenth transistor M17 (Vth_M17') is still maintained at V3−Vth_M12−Vth_M17 by adjusting the active level voltage provided by the third power supply terminal to V3'.

That is, V3'−Vth_M12'−Vth_M17'=V3−Vth_M12−Vth_M17.

At this time, V3'=V3+(Vth_M12'−Vth_M12)+(Vth_M17'−Vth_M17)=V3+ΔVth_M12+ΔVth_M17;

ΔVth_M17≈ΔVth_M12;

Therefore, V3'≈V3+2×ΔVth_M12;

ΔVth_M12=Vdtc11−Vdtc12;

Therefore, V3'≈V3+2× (Vdtc11−Vdtc12);

Therefore, in the embodiments of the present disclosure, when the active level voltage provided by the third power supply terminal is adjusted based on the first detection voltage, the adjusted active level voltage provided by the third power supply terminal may be adjusted to V3+2× (Vdtc11−Vdtc12).

Alternatively, the above adjustment manner is only an optional embodiment in the present disclosure, and does not limit the technical solution of the present disclosure. In practical applications, a corresponding adjustment algorithm may be provided according to the first detection voltage as needed. Further, in the above example, only the case is exemplified where the first detection voltage is the same as the voltage at the pull-down node PD.

Figure 7:
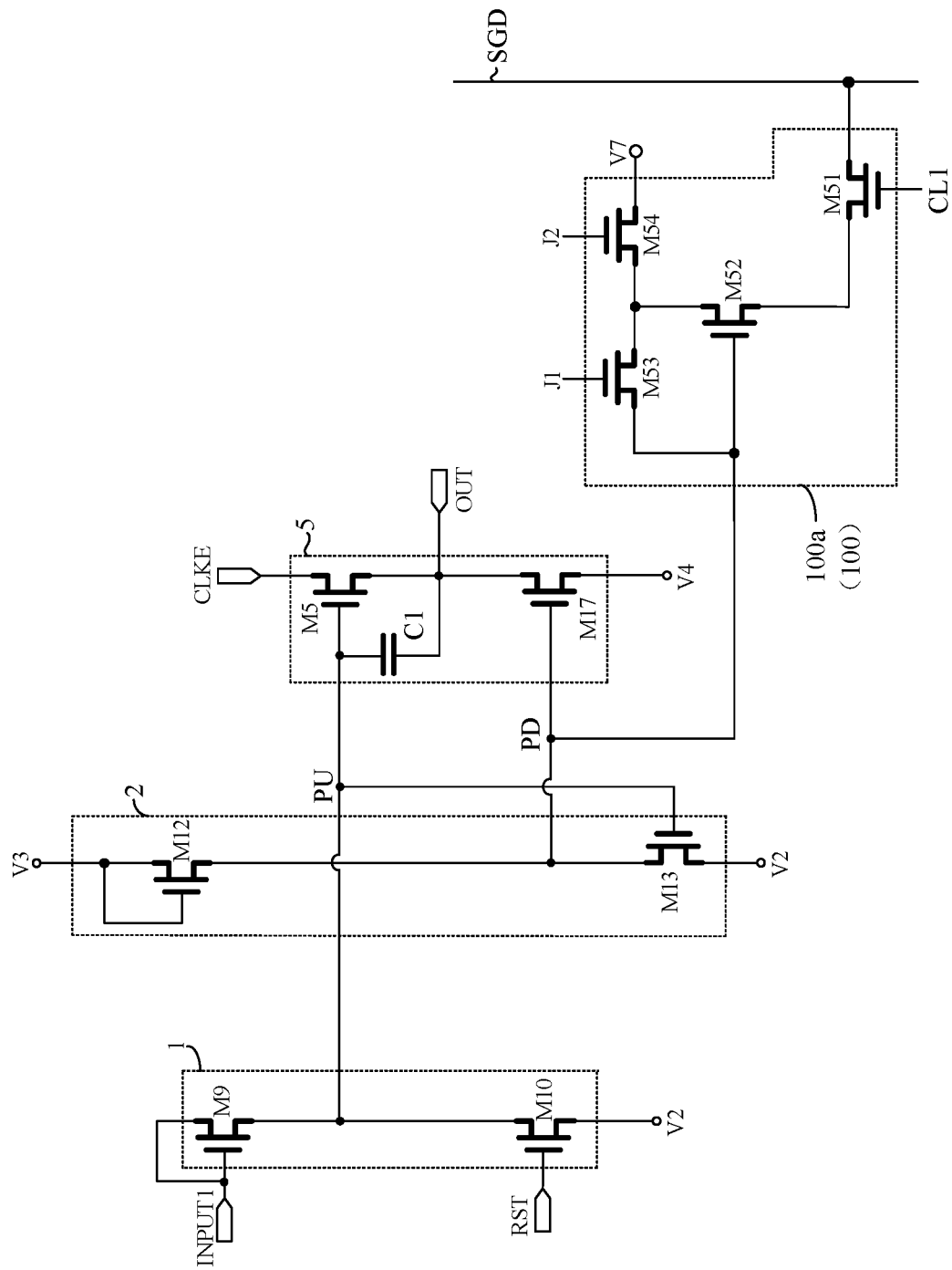
FIG. 7 is a schematic diagram of another circuit structure of a shift register according to embodiments of the present disclosure.
Figure 8:
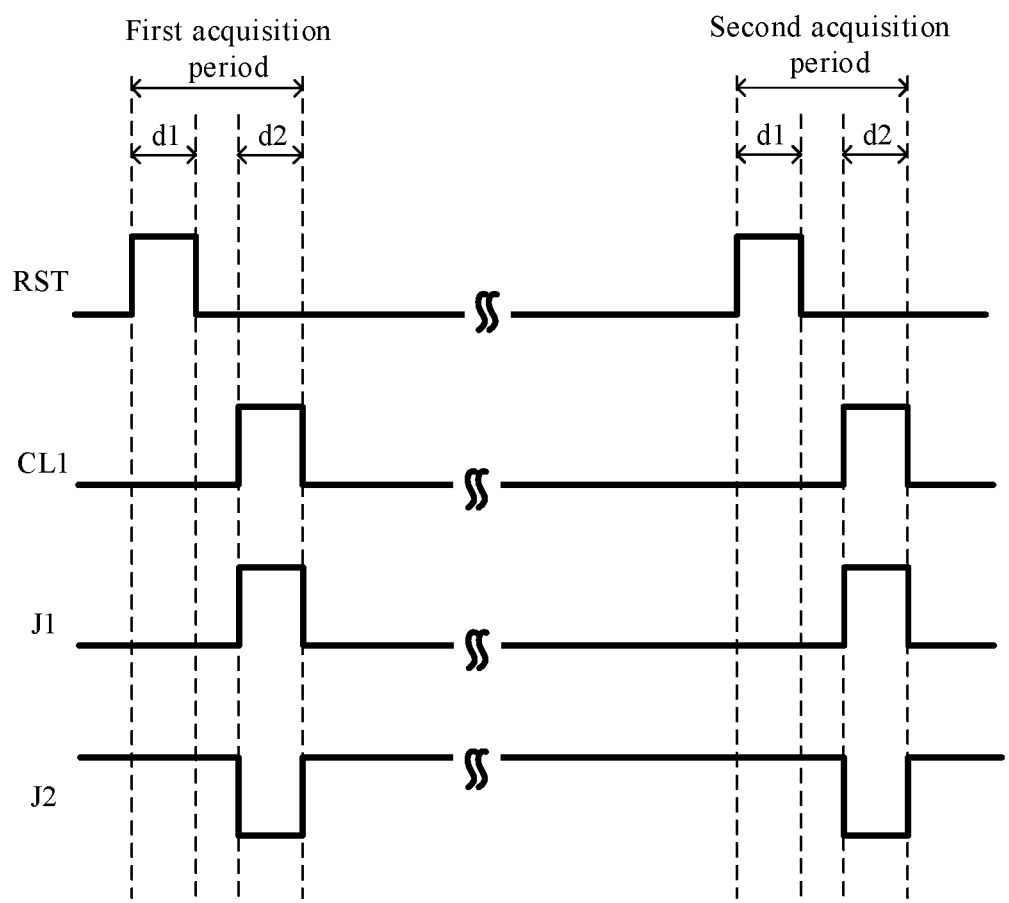
FIG. 8 is a timing diagram illustrating an operation of a first detection circuit in the shift register shown in FIG. 7 during a voltage acquisition process.

FIG. 7 is a schematic diagram of another circuit structure of a shift register according to embodiments of the present disclosure; FIG. 8 is a timing diagram illustrating an operation of a first detection circuit in the shift register shown in FIG. 7 during a voltage acquisition process. As shown in FIGS. 7 and 8, unlike the case where the first detection sub-circuit 100a shown in FIG. 5 includes only the fifty-first transistor M51, the first detection sub-circuit 100a shown in FIG. 7 includes the fifty-first transistor M51, a fifty-second transistor M52, a fifty-third transistor M53, and a fifty-fourth transistor M54.

A control electrode of the fifty-first transistor M51 is connected to the first acquisition control terminal CL1, a first electrode of the fifty-first transistor M51 is connected to a second electrode of the fifty-second transistor M52, and a second electrode of the fifty-first transistor M51 is connected to the first signal detection line SGD.

A control electrode of the fifty-second transistor M52 is connected to the pull-down node PD, and a first electrode of the fifty-second transistor M52 is connected to a second electrode of the fifty-third transistor M53 and a first electrode of the fifty-fourth transistor M54.

A control electrode of the fifty-third transistor M53 is connected to a first switch control terminal J1, and a first electrode of the fifty-third transistor M53 is connected to the control electrode of the fifty-second transistor M52.

A control electrode of the fifty-fourth transistor M54 is connected to a second switch control terminal J2, and a second electrode of the fifty-fourth transistor M54 is connected to a seventh power supply terminal.

The seventh power supply terminal provides a voltage V7 as a low level voltage. As an example, the low level voltage V7 may be equal to the low level voltage V2 provided by the second power supply terminal.

Referring to FIG. 8, a non-acquisition period (in which the gate driving circuit may normally drive the display apparatus) is provided between the first acquisition period and the second acquisition period. The first acquisition period and the second acquisition period each include: a first sub-phase d1 and a second sub-phase d2.

In the first sub-phase d1 of the first acquisition period, the display reset signal input terminal RST provides a high level signal, the first acquisition control terminal CL1 provides a low level signal, the first switch control terminal J1 provides a low level signal, and the second switch control terminal J2 provides a high level signal. At this time, the tenth transistor M10 is turned on, the fifty-first transistor M51 is turned off, the fifty-third transistor M53 is turned off, and the fifty-fourth transistor M54 is turned on. A low level voltage provided by the second power supply terminal is written to the pull-up node PU, and the pull-up node PU is at a low level; accordingly, the thirteenth transistor M13 is turned off, and a high level voltage provided by the third power supply terminal is written to the pull-down node PD through the twelfth transistor M12, and the voltage actually written to the pull-down node PD is V3−Vth_M12, where Vth_M12 is the threshold voltage of the twelfth transistor M12 in the first acquisition period.

In the second sub-phase d2 of the first acquisition period, the first acquisition control terminal CL1 provides a high level signal, the first switch control terminal J1 provides a high level signal, and the second switch control terminal J2 provides a low level signal. At this time, the fifty-first transistor M51 and the fifty-third transistor M53 are turned on, and the fifty-fourth transistor M54 is turned off.

Since the fifty-third transistor M53 is turned on, the voltage at the pull-up node PU charges the first electrode of the fifty-first transistor through the fifth-twelfth transistor M52; when a voltage at the first electrode of the fifty-first transistor M51 is charged to V3−Vth_M12−Vth_M52, a gate-source voltage of the fifty-second transistor M52 is equal to the current threshold voltage Vth_M52 of the fifty-second transistor M52, and the fifty-second transistor M52 is switched to being in an OFF state. At this time, since the fifty-first transistor M51 is turned on, the first detection voltage output to the first signal detection line SGD is Vdtc11=V3−Vth_M12−Vth_M52.

In the non-acquisition period, the first acquisition control terminal CL1 provides a low level signal, the first switch control terminal J1 provides a low level signal, and the second switch control terminal J2 provides a high level signal. That is, both the fifty-first transistor M51 and the fifty-third transistor M53 are turned off, and the fifty-fourth transistor M54 is turned on. By such a design, the voltage applied to the fifty-fifth transistor M52 is the same as the voltage applied to the seventeenth transistor M17 in the output circuit 5 in the non-acquisition period. That is, a drift amount of the threshold voltage of the fifty-second transistor M52 is the same as that of the seventeenth transistor M17.

After the non-acquisition period is ended, the process enters the second acquisition period, and the specific operating process in the second acquisition period is the same as that of the first acquisition period, and is not described here again. In the second acquisition period, the first detection voltage output by the first detection sub-circuit 100a to the first signal detection line SGD is Vdtc12=V3−Vth_M12'−Vth_M52'.

In the embodiments of the present disclosure, the external first chip may obtain the overall drift of the threshold voltage of the twelfth transistor M12 and the threshold voltage of the fifty-second transistor M52 by comparing the first detection voltage Vdtc11 acquired in the first acquisition period with the first detection voltage Vdtc12 acquired in the second acquisition period. For example, a drift amount ΔVth_M12 of the threshold voltage of the twelfth transistor M12 in a period from the first acquisition period to the second acquisition period may be obtained through a difference Vdtc11−Vdtc12 between the two first detection voltages, ΔVth_M12=Vth_M12'−Vth_M12=Vdtc11−Vdtc12. For example, an overall drift amount ΔVth_M12+ΔVth_M52 of the threshold voltage of the twelfth transistor M12 and the threshold voltage of the fifty-second transistor M52 in a period (i.e., corresponding to the non-acquisition period) from the first acquisition period to the second acquisition period may be obtained through a difference Vdtc11−Vdtc12 between the two first detection voltages, ΔVth_M12=Vth_M12'−Vth_M12=Vdtc11−Vdtc12.

$$\Delta Vth\_M12 + \Delta Vth\_M52 = (Vth\_M12' - Vth\_M12) + (Vth\_M52' - Vth\_M52) = Vdtc11 - Vdtc12.$$

The drift amount ΔVth_M52 of the threshold voltage of the fifty-second transistor M52 is the same as the drift amount ΔVth_M17 of the threshold voltage of the seventeenth transistor M17, so that ΔVth_M12+ΔVth_M17=Vdtc11−Vdtc12.

In the first acquisition period, the difference between the voltage at the control electrode of the seventeenth transistor M17 (the voltage at the pull-down node PD) and the threshold voltage of the seventeenth transistor M17 is V3−Vth_M12−Vth_M17. After the threshold voltage of the twelfth transistor M12 drifts to Vth_M12' and the threshold voltage of the seventeenth transistor M17 drifts to Vth_M17', in order to ensure that the seventeenth transistor M17 is still turned on normally, the difference between the voltage at the control electrode of the seventeenth transistor M17 (i.e., V3'−Vth_M12') and the threshold voltage of the seventeenth transistor M17 (Vth_M17') is still maintained at V3−Vth_M12−Vth_M17 by adjusting the active level voltage provided by the third power supply terminal to V3'.

That is, V3'−Vth_M12'−Vth_M17'=V3−Vth_M12−Vth_M17;

At this time, V3'=V3+ (Vth_M12'−Vth_M12)+ (Vth_M17'−Vth_M17)=V3+ΔVth_M12+ΔVth_M17;

ΔVth_M12+ΔVth_M17=Vdtc11−Vdtc12;

Therefore, V3'=V3+ (Vdtc11−Vdtc12).

Therefore, in the embodiments of the present disclosure, when the active level voltage provided by the third power supply terminal is adjusted based on the first detection voltage, the adjusted active level voltage provided by the third power supply terminal may be adjusted to V3+ (Vdtc11−Vdtc12).

In the embodiments of the present disclosure, the first detection voltage output to the first signal detection line SGD by the first detection sub-circuit 100a is different from the voltage at the pull-down node PD. In addition, the adjustment algorithm used when the active level voltage output by the third power supply terminal is adjusted based on the first detection voltage in the embodiments of the present disclosure is also different from that in the previous embodiments.

Figure 9A:
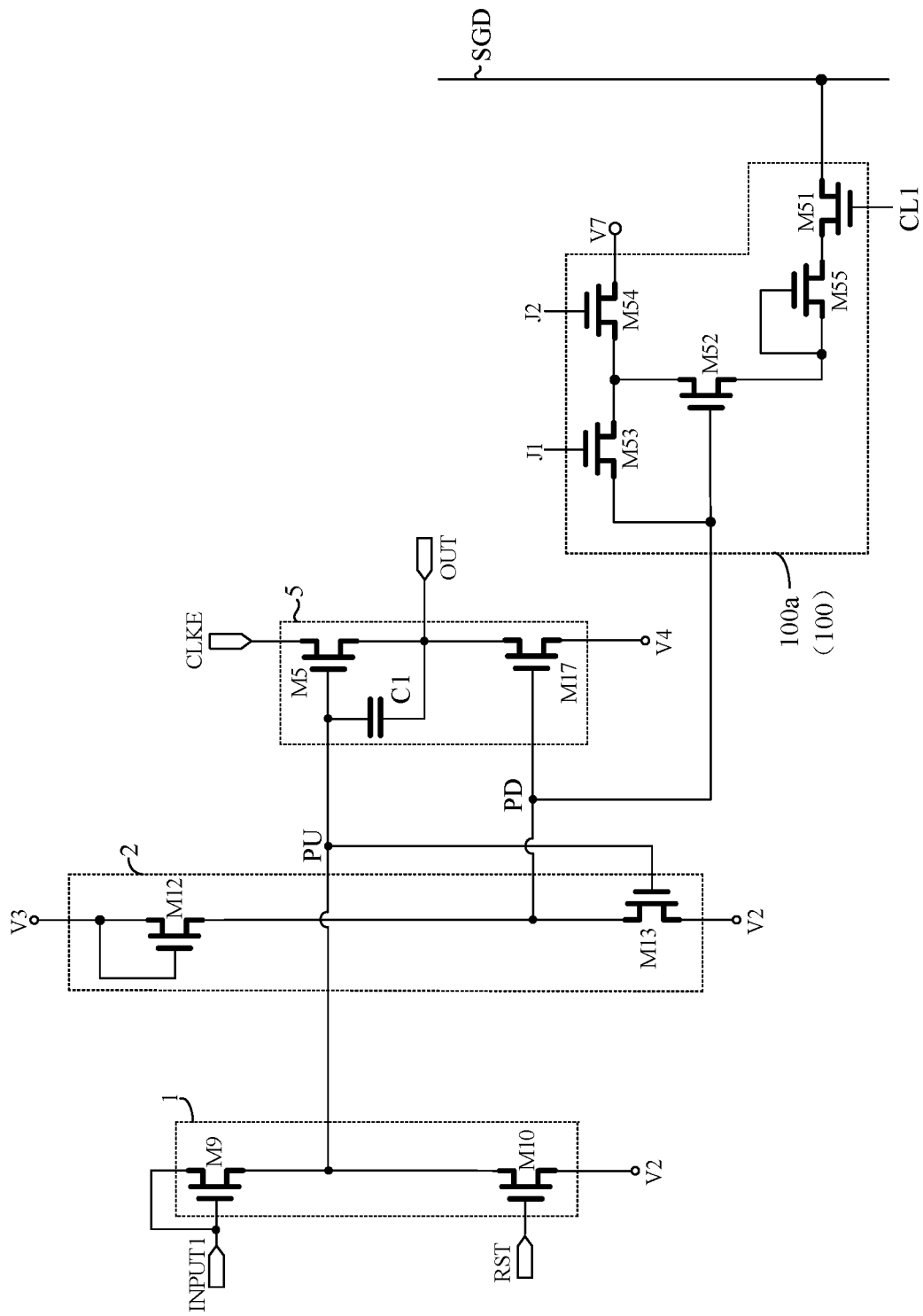
FIGS. 9A and 9B are schematic diagrams of two circuit structures of a shift register according to embodiments of the present disclosure.
Figure 9B:
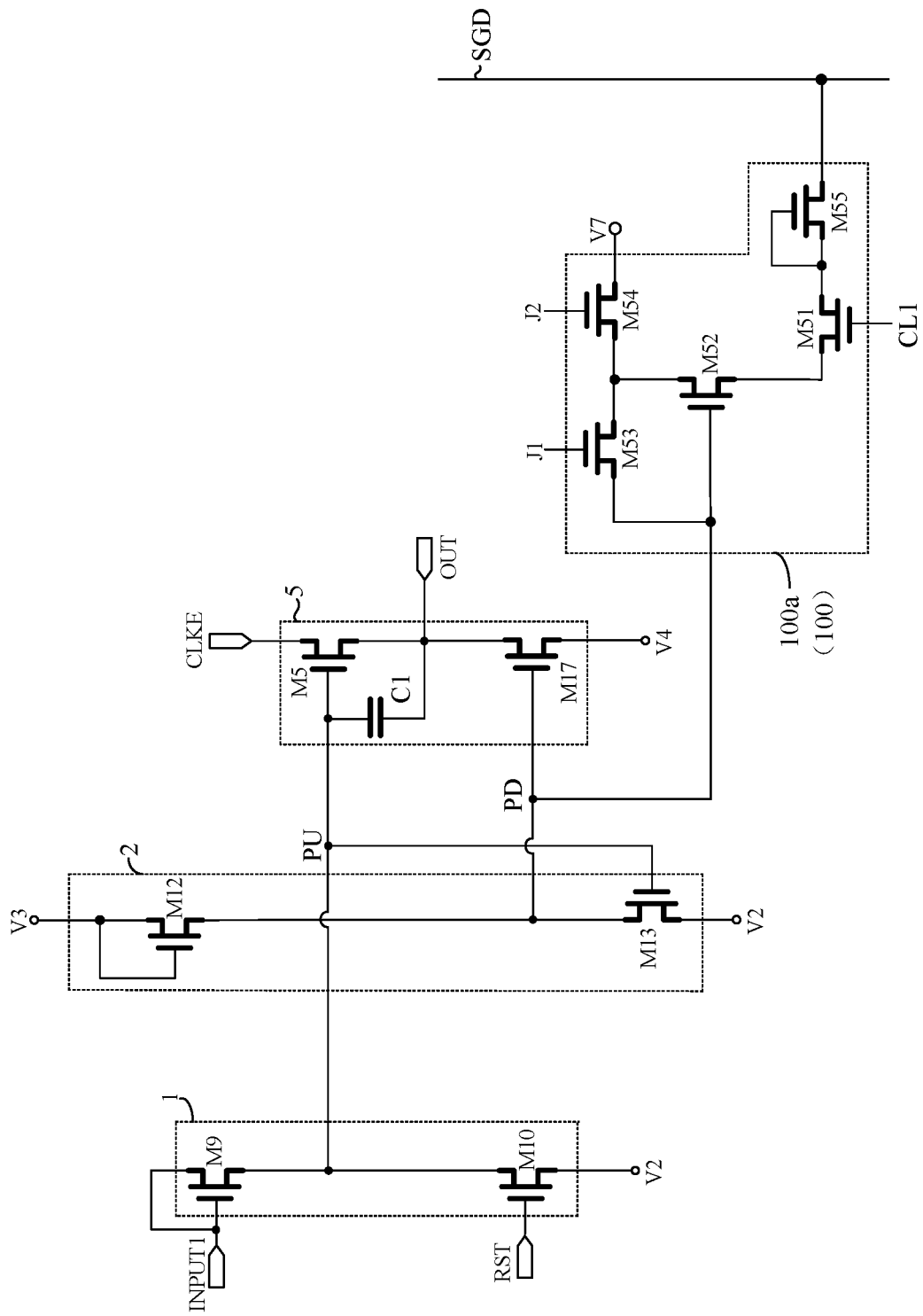

FIGS. 9A and 9B are schematic diagrams of two circuit structures of a shift register according to embodiments of the present disclosure. FIGS. 9A and 9B are further improvement on the shift register shown in FIG. 7, and the first detection sub-circuit 100a includes not only the fifty-first transistor M51 to the fifty-fourth transistor M54 shown in FIG. 7, but also includes a fifty-fifth transistor M55.

Referring to FIG. 9A, as an example, the second electrode of the fifty-second transistor M52 is connected to the first electrode of the fifty-first transistor M51 to the fifty-fifth transistor M55, a control electrode and a first electrode of the fifty-fifth transistor M55 are both connected to the second electrode of the fifty-second transistor M52, and a second electrode of the fifty-fifth transistor M55 is connected to the first electrode of the fifty-first transistor M51.

Referring to FIG. 9B, as an example, the second electrode of the fifty-first transistor M51 is connected to the first signal detection line SGD through the fifty-fifth transistor M55, the control electrode and the first electrode of the fifty-fifth transistor M55 are both connected to the second electrode of the fifty-first transistor M51, and the second electrode of the fifty-fifth transistor M55 is connected to the first signal detection line SGD.

The operating timing of the voltage acquisition process performed by the first detection circuit 100 in the shift register shown in FIGS. 9A and 9B may adopt that shown in FIG. 8, and for the description of the specific operating process, reference may be made to the corresponding content in the foregoing embodiments, which is not described here again.

In FIGS. 9A and 9B, by providing the above diode-connected fifty-fifth transistor M55, a voltage value of the first detection voltage output from the first detection sub-circuit 100a to the first signal detection line SGD can be effectively reduced. Specifically, the voltage value of the first detection voltage output by the first detection circuit 100 in the first acquisition period is Vdtc11=V3−Vth_M12−Vth_M52−Vth_M55; the voltage value of the first detection voltage output by the first detection circuit 100 in the second acquisition period is Vdtc12=V3−Vth_M12'−Vth_M52'−Vth_M55. Vth_M55 is a threshold voltage of the fifty-fifth transistor M55.

In practical applications, the first chip connected to the first signal detection line SGD usually has a certain requirement on the voltage value of the input signal. For example, the voltage value of the input signal is required to be less than or equal to 6V, and the active level voltage provided by the third power supply terminal is generally about 12V, at this time, there is a risk that the voltage output from the first detection sub-circuit 100a to the first signal detection line SGD is greater than 6V, which may cause the first chip connected to the first signal detection line SGD to fail to operate. By providing the above fifty-fifth transistor M55 and designing the threshold voltage of the fifty-fifth transistor M55 in advance, the first detection voltage output from the first detection sub-circuit 100a to the first signal detection line SGD may be controlled to be always less than 6V.

In addition, the fifty-fifth transistor M55 is provided so that a signal in the first signal detection line SGD can be effectively prevented from reversely charging the first detection sub-circuit 100a, and the service life of the transistor in the first detection sub-circuit 100a can be prolonged.

Figure 10:
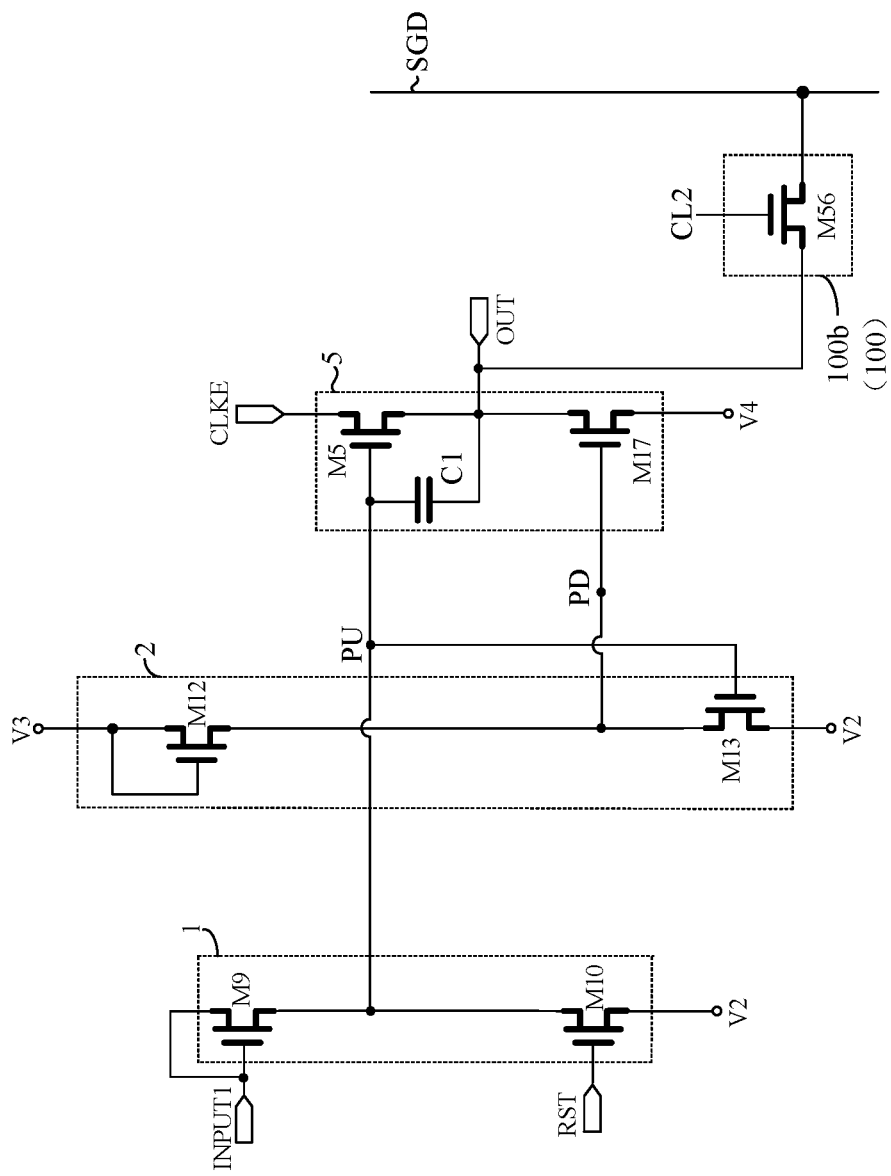
FIG. 10 is a schematic diagram of another circuit structure of a shift register according to embodiments of the present disclosure.
Figure 11:
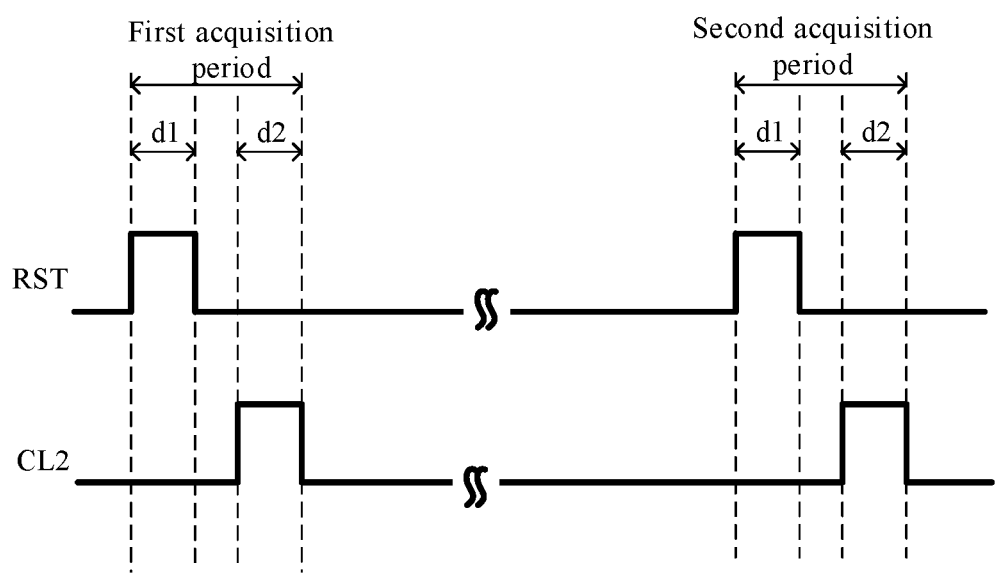
FIG. 11 a timing diagram illustrating an operation of a second detection circuit in the shift register shown in FIG. 10 during a voltage acquisition process.

FIG. 10 is a schematic diagram of another circuit structure of a shift register according to embodiments of the present disclosure; FIG. 11 a timing diagram illustrating an operation of a second detection circuit in the shift register shown in FIG. 10 during a voltage acquisition process. In some embodiments, the second detection sub-circuit 100b includes: a fifty-sixth transistor M56; a control electrode of the fifty-sixth transistor M56 is connected to the corresponding second acquisition control terminal CL2, a first electrode of the fifty-sixth transistor M56 is connected to the signal output terminal OUT, and a second electrode of the fifty-sixth transistor M56 is connected to the first signal detection line SGD.

In the present embodiment, a voltage V4 as a high level voltage is provided by the fourth power supply terminal connected to the output circuit 5 corresponding to the second detection circuit 200, and the high level voltage V4 is greater than or equal to the high level voltage V3.

Referring to FIG. 11, the first acquisition period includes: a first sub-phase d1 and a second sub-phase d2. In the first sub-phase d1, the display reset signal input terminal RST provides a high level signal, and the second acquisition control terminal CL2 provides a low level signal. The tenth transistor M10 is turned on, and the fifty-sixth transistor M56 is turned off. A low level voltage provided by the second power supply terminal is written to the pull-up node PU, and the pull-up node PU is at a low level; accordingly, the thirteenth transistor M13 is turned off, and the high level voltage provided by the third power supply terminal is written to the pull-down node PD through the twelfth transistor M12, and the voltage actually written to the pull-down node PD is V3−Vth_M12, where Vth_M12 is the threshold voltage of the twelfth transistor M12 in the first acquisition period. Accordingly, the seventeenth transistor M17 is turned on, the fourth power supply terminal charges the signal output terminal OUT; when the voltage at the signal output terminal OUT is charged to V3−Vth_M12−Vth_M17, a gate-source voltage of the seventeenth transistor M17 is equal to the current threshold voltage Vth_M17 of the seventeenth transistor M17, and the seventeenth transistor M17 is switched to being in an OFF state.

In the second sub-phase d2, the second acquisition control terminal CL2 provides a high level signal, the fifty-sixth transistor M56 is turned on, and the voltage at the signal output terminal OUT is written to the first signal detection line SGD through the fifty-sixth transistor M56, i.e., the second detection voltage acquired through the first signal detection line SGD is Vdtc21=V3−Vth_M12−Vth_M17.

After a period of time (which may be preset according to actual conditions), the process enters the second acquisition period, and the second acquisition period also includes two sub-phases: a first sub-phase d1 and a second sub-phase d2. The specific process in the second acquisition period is the same as the process in the first acquisition period, and is not described herein again. In the second sub-phase d2 of the second acquisition period, the first detection voltage acquired on the first signal detection line SGD is Vdtc22=V3−Vth_M12′−Vth_M17′.

In the embodiments of the present disclosure, the external first chip may obtain an overall drift of the threshold voltage of the twelfth transistor M12 and the threshold voltage of the seventeenth transistor M17 by comparing the second detection voltage Vdtc21 acquired in the first acquisition period with the second detection voltage Vdtc22 acquired in the second acquisition period. For example, a drift amount ΔVth_M12+ΔVth_M17 of the threshold voltage of the twelfth transistor M12 and the threshold voltage of the seventeenth transistor M17 as a whole in a period (i.e., corresponding to the non-acquisition period) from the first acquisition period to the second acquisition period may be obtained through a difference Vdtc21−Vdtc22 between the two second detection voltages.

Similar to the voltage adjustment scheme for the shift register shown in FIG. 8 as above, in the present embodiment, when the active level voltage provided by the third power supply terminal is adjusted based on the second detection voltage, the adjusted active level voltage V3′ provided by the third power supply terminal may be adjusted to V3+(Vdtc21−Vdtc22). The specific adjustment principle may be referred to the corresponding content in the foregoing embodiments, and is not described in detail here.

In some embodiments, the number of the output circuits 5 is m, the number of the second detection sub-circuits 100b is n, the number of the second acquisition control terminals CL2 is n, the second detection sub-circuits 100b are in one-to-one correspondence with the second acquisition control terminals CL2; m and n are positive integers, and m≥n; different second detection sub-circuits 100b correspond to different output circuits 5, and the second detection sub-circuits 100b are connected to the signal output terminals OUT of the corresponding output circuits 5. The detailed description will be provided below with reference to examples.

Figure 12:
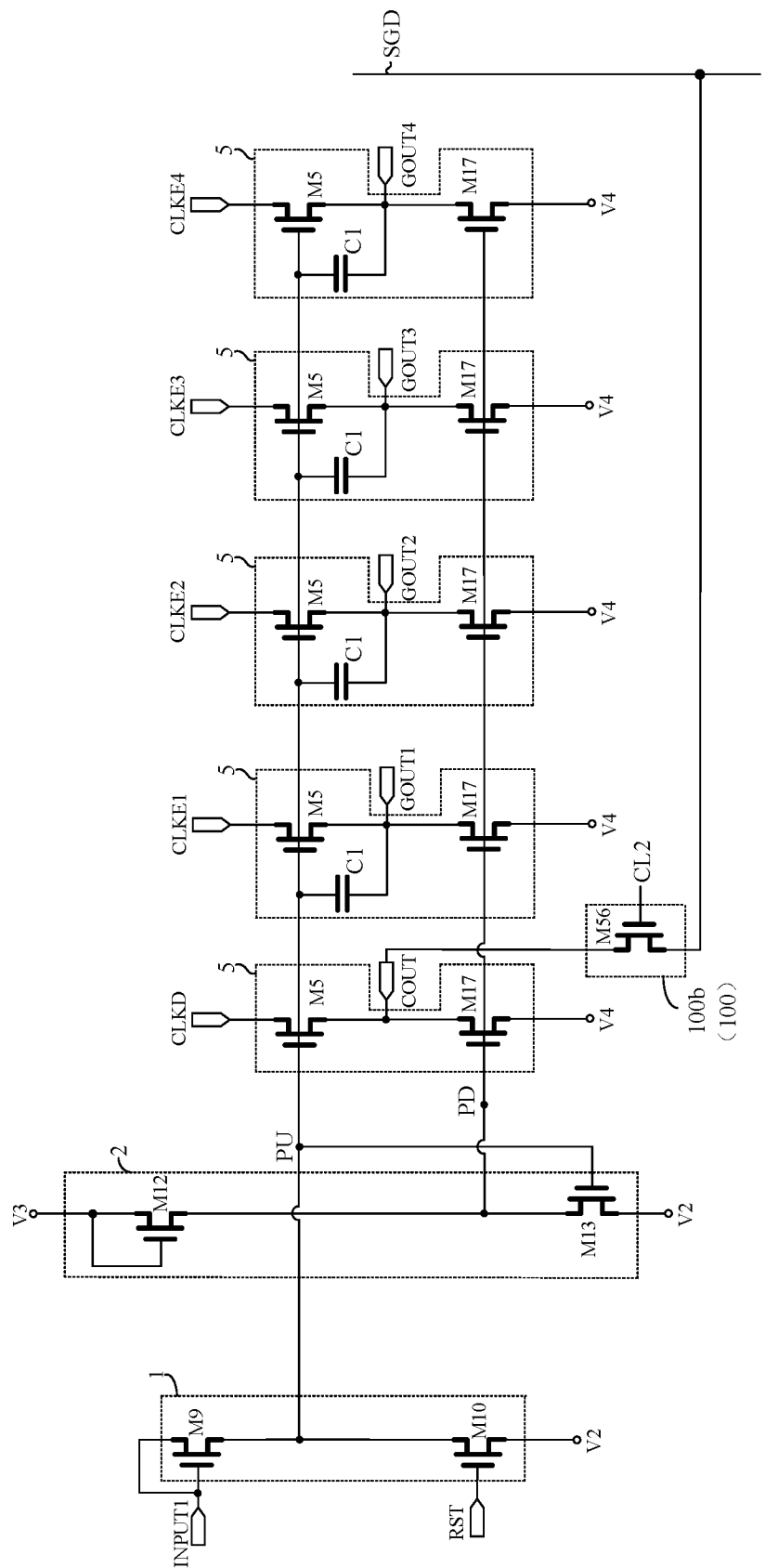
FIG. 12 is a schematic diagram of another circuit structure of a shift register according to embodiments of the present disclosure.

FIG. 12 is a schematic diagram of another circuit structure of a shift register according to embodiments of the present disclosure. As shown in FIG. 12, in some embodiments, the shift register includes the plurality of output circuits 5, which generally include one cascade output circuit 5 and at least one driving output circuit 5 (four driving output circuits 5 are exemplarily shown in FIG. 12). A signal output terminal of the cascade output circuit 5 is a cascade signal output terminal COUT connected to other shift registers and not connected to a gate line in a display region, and a signal output by the cascade signal output terminal COUT is used for cascade connection between the shift registers; a signal output terminal of each driving output circuit 5 is a driving signal output terminal GOUT connected to a corresponding gate line in the display region and not connected to other shift registers, and a signal output by the driving signal output terminal GOUT is used for driving the corresponding gate line.

An output clock signal terminal of the cascade output circuit 5 is a cascade output clock signal terminal CLKD, and output clock signal terminals of the driving output circuits 5 are driving output clock signal terminals CLKE1 to CLKE4. The cascade output circuit 5 may or may not include a first capacitor C1.

FIG. 12 shows that one second detection sub-circuit 100b is provided in the shift register, and is connected to the cascade signal output terminal COUT of the cascade output circuit 5.

Alternatively, in some embodiments, the second detection sub-circuit 100b may be selectively connected to the driving signal output terminals OUT of one driving output circuit 5.

Figure 13:
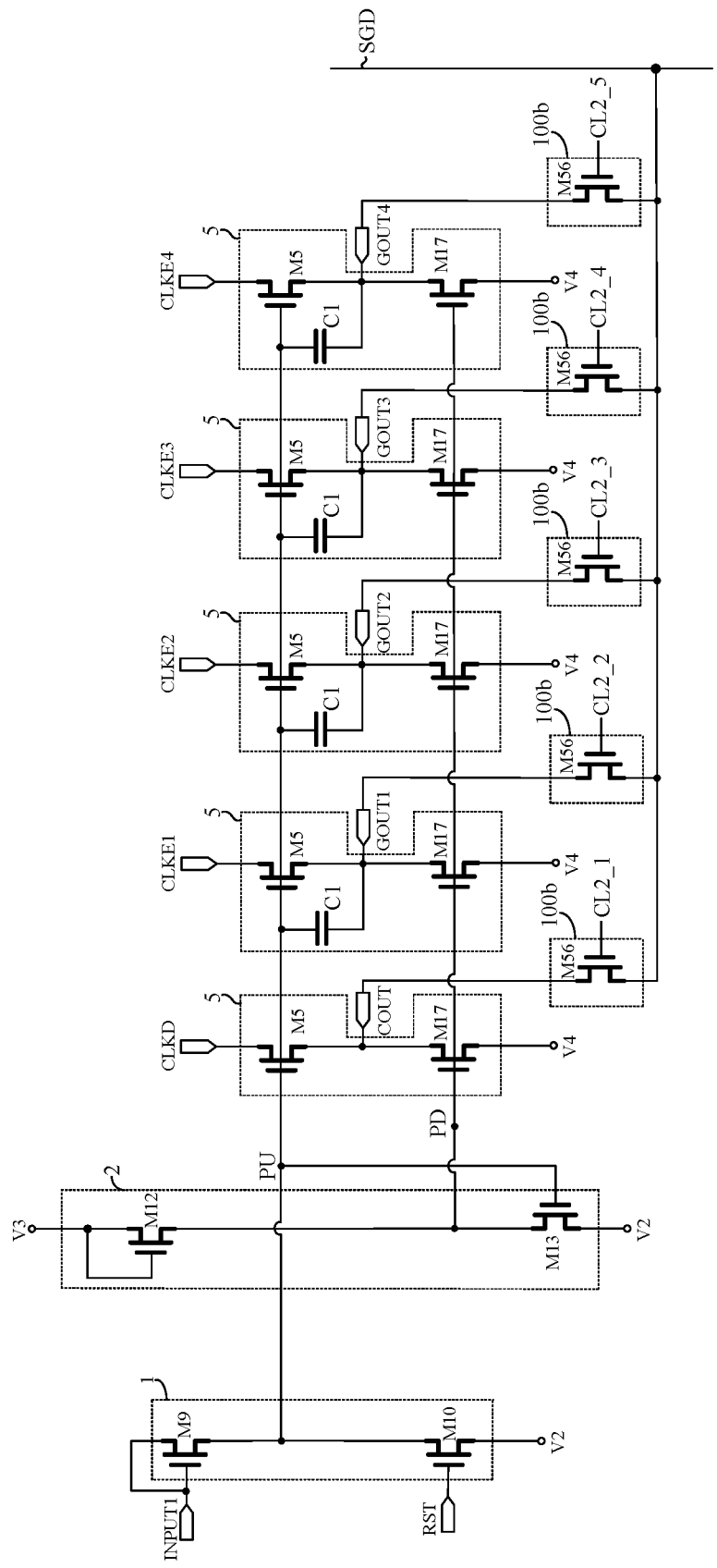
FIG. 13 is a schematic diagram of another circuit structure of a shift register according to embodiments of the present disclosure.

FIG. 13 is a schematic diagram of another circuit structure of a shift register according to embodiments of the present disclosure. As shown in FIG. 13, a plurality of second detection sub-circuits 100b in one-to-one correspondence with the output circuits 5 are illustrated in the embodiments shown in FIG. 13, unlike the case where only one second detection sub-circuit 100b is provided as shown in FIG. 12.

One acquisition period of the shift register shown in FIG. 13 includes a first sub-phase and a second sub-phase, and for the first sub-phase, reference may be made to the corresponding content for the first sub-phase in FIG. 11 as above, and only the second sub-phase is described in detail below.

Specifically, in the second sub-phase, high level signals are sequentially provided to the second acquisition control terminals CL2 to control the fifty-sixth transistors M56 in the second detection sub-circuits 100b to be sequentially turned on, so that the second detection sub-circuits 100b sequentially write the corresponding second detection voltages to the first signal detection line SGD.

In practical applications, the threshold voltage drifts of the seventeenth transistors M17 in different output circuits 5 may be different from each other, so that the signals output by the signal output terminals OUT of different output circuits 5 may be acquired by the plurality of second detection sub-circuits 100b, so as to obtain the threshold voltage drifts of the seventeenth transistors M17 in different output circuits 5 and the threshold voltage of the twelfth transistor M12 as a whole, and then how to adjust the active level voltage provided by the third power supply terminal is determined based on the second detection voltages output by the second detection sub-circuits 100b.

As an example, the second detection voltages acquired by the plurality of second detection sub-circuits 100b in the first acquisition period are averaged to obtain an averaged value, and the second detection voltages acquired by the plurality of second detection sub-circuits 100b in the second acquisition period are averaged to obtain an averaged value, and then the active level voltage provided by the third power supply terminal is adjusted according to the two averaged values.

It should be understood by one of ordinary skill in the art that when a plurality of the output circuits 5 are provided, the number of the second detection sub-circuits 100b provided in the shift register may be one or more, as long as it is ensured that the number of the second detection sub-circuits 100b is less than or equal to the number of the output circuits 5.

Figure 14:
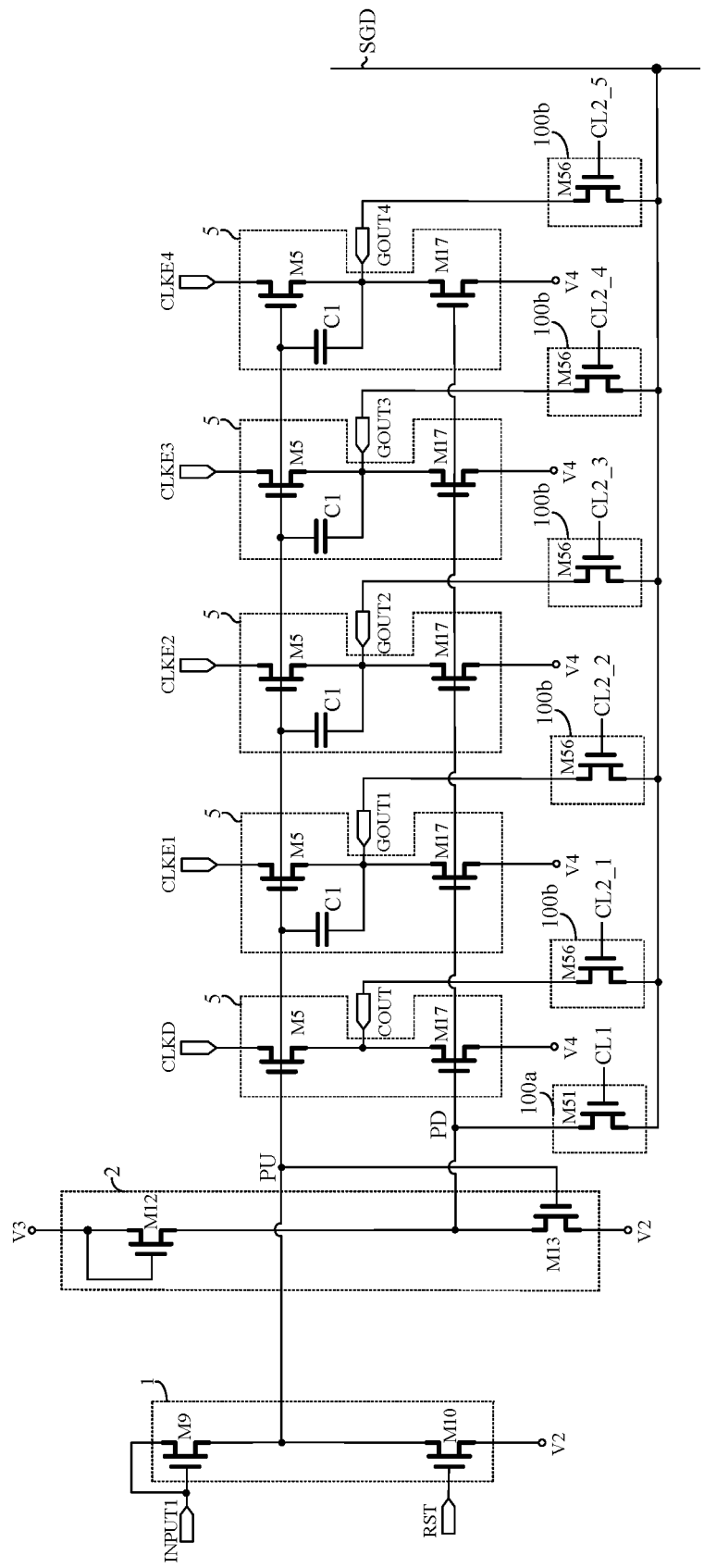
FIG. 14 is a schematic diagram of another circuit structure of a shift register according to embodiments of the present disclosure.

FIG. 14 is a schematic diagram of another circuit structure of a shift register according to embodiments of the present disclosure. In the solution shown in FIG. 14, the first detection circuit 100 includes not only the first detection sub-circuit 100a, but also the second detection sub-circuits 100b; high level signals may be sequentially provided to the first acquisition control terminal CL1 and the second acquisition control terminals CL2, so as to control the first detection sub-circuit 100a and the second detection sub-circuits 100b to sequentially provide detection voltages to the first signal detection line SGD.

The first detection voltage output by the first detection sub-circuit 100a may reflect a threshold voltage drift of a transistor (e.g., the twelfth transistor M12 in FIG. 14) in the inverter circuit 2 having a control electrode connected to the third power supply terminal, and the second detection voltage output by each second detection sub-circuit 100b may reflect an overall drift of threshold voltages of the transistor in the inverter circuit 2 having the control electrode connected to the third power supply terminal and a pull-down transistor (e.g., the seventeenth transistor M17 in FIG. 14) in the corresponding output circuit 5, so that the threshold voltage drift of the pull-down transistor in the corresponding output circuit 5 may be reflected based on a difference between the corresponding second detection voltage and the first detection voltage. That is, when the first detection sub-circuit 100a and the second detection sub-circuits 100b are both provided, the threshold voltage drift of the transistor in the inverter circuit 2 having the control electrode connected to the third power supply terminal and the threshold voltage drift of the pull-down transistor in the corresponding output circuit 5 may be obtained, respectively, so that the threshold voltage drift of the corresponding pull-down transistor can be accurately controlled, and thus the voltage provided to the electrode of the corresponding pull-down transistor can be accurately subsequently controlled according to actual requirements.

Figure 15:
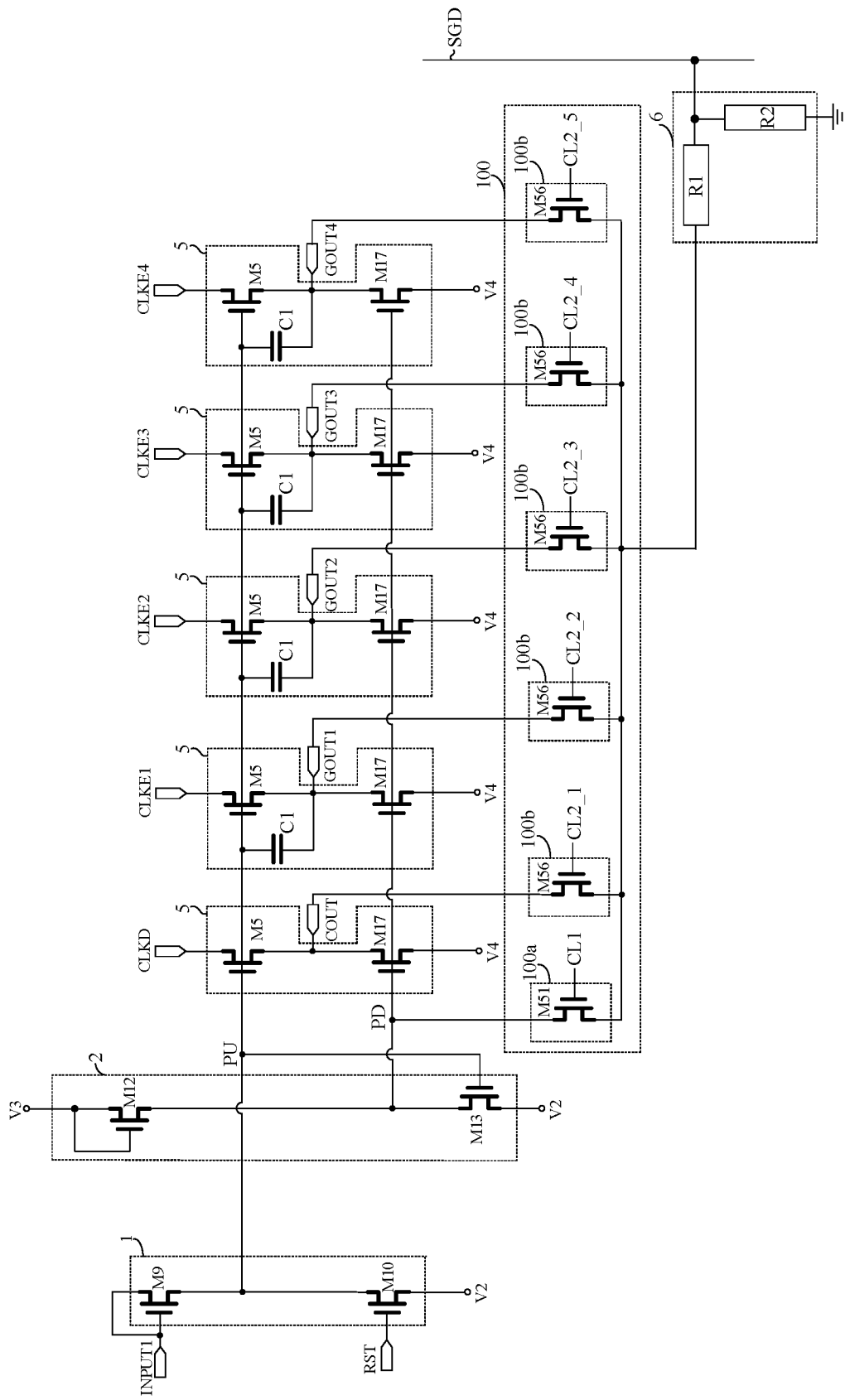
FIG. 15 is a schematic diagram of another circuit structure of a shift register according to embodiments of the present disclosure.

FIG. 15 is a schematic diagram of another circuit structure of a shift register according to embodiments of the present disclosure. As shown in FIG. 15, the shift register shown in FIG. 15 includes not only the first detection circuit 100, but also a voltage-reducing circuit 6 provided between the first detection circuit 100 and the first signal detection line SGD, and the voltage-reducing circuit 6 is configured to perform a voltage-reducing processing on the detection voltage output from the first detection circuit 100 and output the detection voltage subjected to the voltage-reducing processing to the first signal detection line SGD.

Similar to the voltage-reducing function of the fifty-fifth transistor M55 provided in the previous embodiments, by providing the voltage-reducing circuit in the embodiments of the present disclosure, a range of the voltage output by the first detection circuit 100 to the first signal detection line SGD can be effectively controlled, so as to avoid the situation that the excessive voltage output by the first detection circuit 100 cannot be read by the external first chip.

In practical applications, the threshold voltage of the fifty-fifth transistor M55 is not too great (generally less than 3V), and therefore the voltage-reducing degree of the fifty-fifth transistor M55 is limited, the voltage-reducing circuit 6 may be additionally provided in the present disclosure.

In some embodiments, the voltage-reducing circuit 6 includes: a first resistor R1 and a second resistor R2; a first terminal of the first resistor R1 is connected to the first detection circuit 100, a second terminal of the first resistor R1 is connected to the first signal detection line SGD, a first terminal of the second resistor R2 is connected to the second terminal of the first resistor R1, and a second terminal of the second resistor R2 is connected to a ground terminal. The voltage-reducing function can be realized by a resistance voltage division principle.

For a detailed description of the first detection circuit 100 in FIG. 15, reference may be made to the contents in the foregoing embodiments, and details are not repeated here.

Figure 16A:
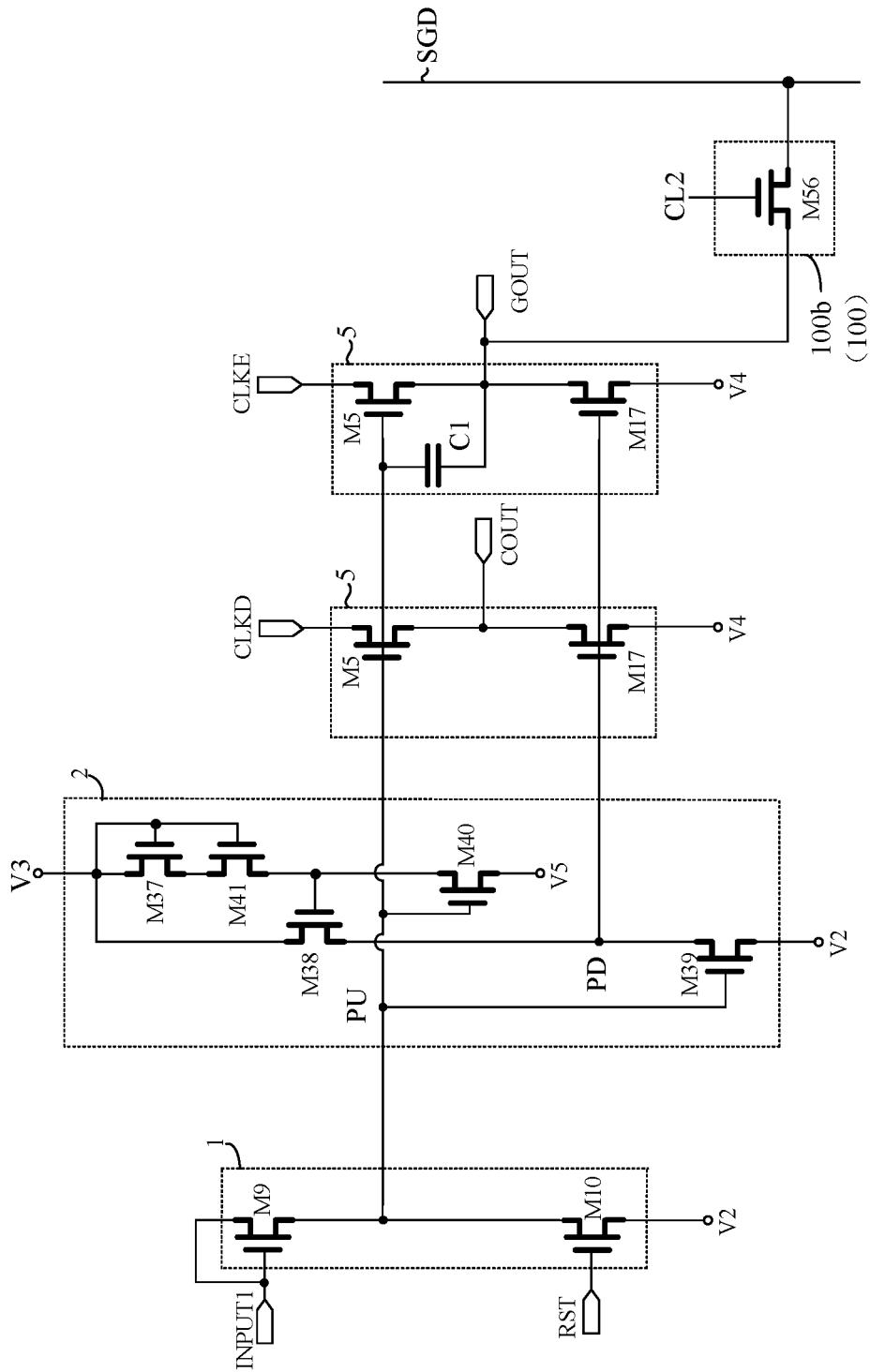
FIGS. 16A and 16B are schematic diagrams of two circuit structures of a shift register according to embodiments of the present disclosure.
Figure 16B:
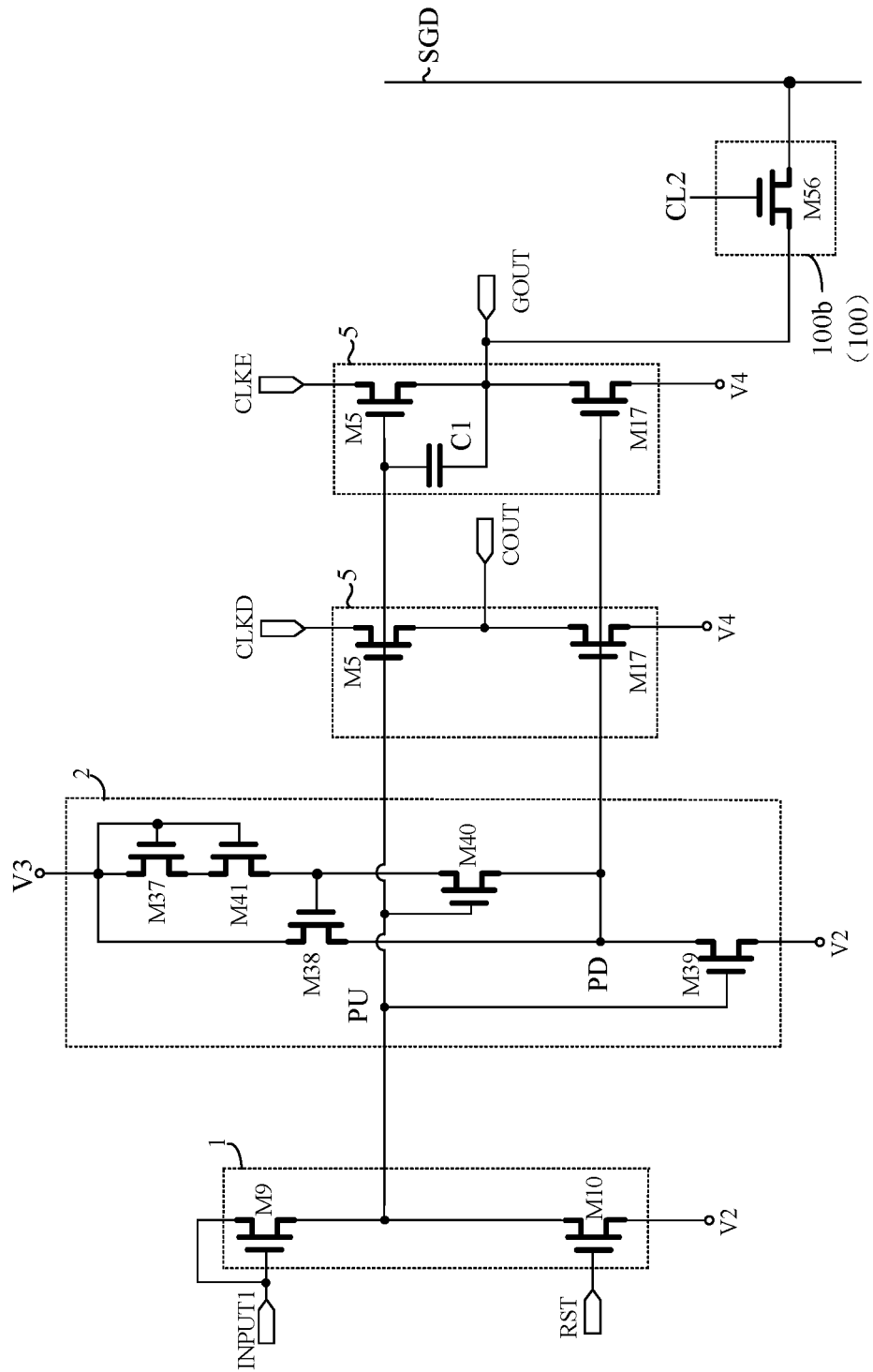

FIGS. 16A and 16B are schematic diagrams of two circuit structures of a shift register according to embodiments of the present disclosure. As shown in FIGS. 16A and 16B, unlike the circuit structure as shown in the previous embodiments in which the inverter circuit 2 includes the twelfth transistor M12 and the thirteenth transistor M13, the inverter circuit 2 in the shift register shown in FIGS. 16A and 16B includes a thirty-seventh transistor M37, a thirty-eighth transistor M38, a thirty-ninth transistor M39, and a fortieth transistor M40.

A control electrode of the thirty-seventh transistor M37 is connected to the third power supply terminal, a first electrode of the thirty-seventh transistor M37 is connected to the control electrode of the thirty-seventh transistor M37, and a second electrode of the thirty-seventh transistor M37 is connected to a control electrode of the thirty-eighth transistor M38.

The control electrode of the thirty-eighth transistor M38 is connected to a first electrode of the fortieth transistor M40, a first electrode of the thirty-eighth transistor M38 is connected to the third power supply terminal, and a second electrode of the thirty-eighth transistor M38 is connected to the pull-down node PD.

A control electrode of the thirty-ninth transistor M39 is connected to the pull-up node PU, a first electrode of the thirty-ninth transistor M39 is connected to the pull-down node PD, and a second electrode of the thirty-ninth transistor M39 is connected to the second power supply terminal (shown in FIG. 16A).

A control electrode of the fortieth transistor M40 is connected to the pull-up node PU, and a second electrode of the fortieth transistor M40 is connected to a fifth power supply terminal (shown in FIG. 16A) or the pull-down node PD (shown in FIG. 16B).

When the inverter circuit 2 employs the inverter circuit 2 shown in FIG. 16, the high level voltage output by the inverter circuit 2 to the pull-up node PU is V3−Vth_M38, and Vth_M38 is a threshold voltage of the thirty-eighth transistor M38. The function of the thirty-eighth transistor M38 is similar to that of the twelfth transistor M12 in the previous embodiments, and will not be described again.

In some embodiments, the inverter circuit 2 further includes: a forty-first transistor M41; the thirty-seventh transistor M37 is connected to the control electrode of the thirty-eighth transistor M38 through the forty-first transistor M41;

A control electrode of the forty-first transistor M41 is connected to the control electrode of the thirty-seventh transistor M37, a first electrode of the forty-first transistor M41 is connected to the second electrode of the thirty-seventh transistor M37, and a second electrode of the forty-first transistor M41 is connected to the control electrode of the thirty-eighth transistor M38.

It is found in practical applications that when the fortieth transistor M40 is in an OFF state and the thirty-seventh transistor M37 is in an ON state, a charging current (for charging the control electrode of the thirty-eighth transistor M38) with a short duration and a large current value exists between the control electrode of the thirty-eighth transistor M38 and the active level supply terminal, and easily damages (for example, breaks down) the thirty-seventh transistor M37.

In order to solve the above problem, in the embodiments of the present disclosure, the forty-first transistor M41 is disposed between the second electrode of the thirty-seventh transistor M37 and the control electrode of the thirty-eighth transistor M38, so that the charging current between the control electrode of the thirty-eighth transistor M38 and the active level supply terminal can be effectively reduced, so as to prevent the charging current from breaking down the thirty-seventh transistor M37.

Figure 17:
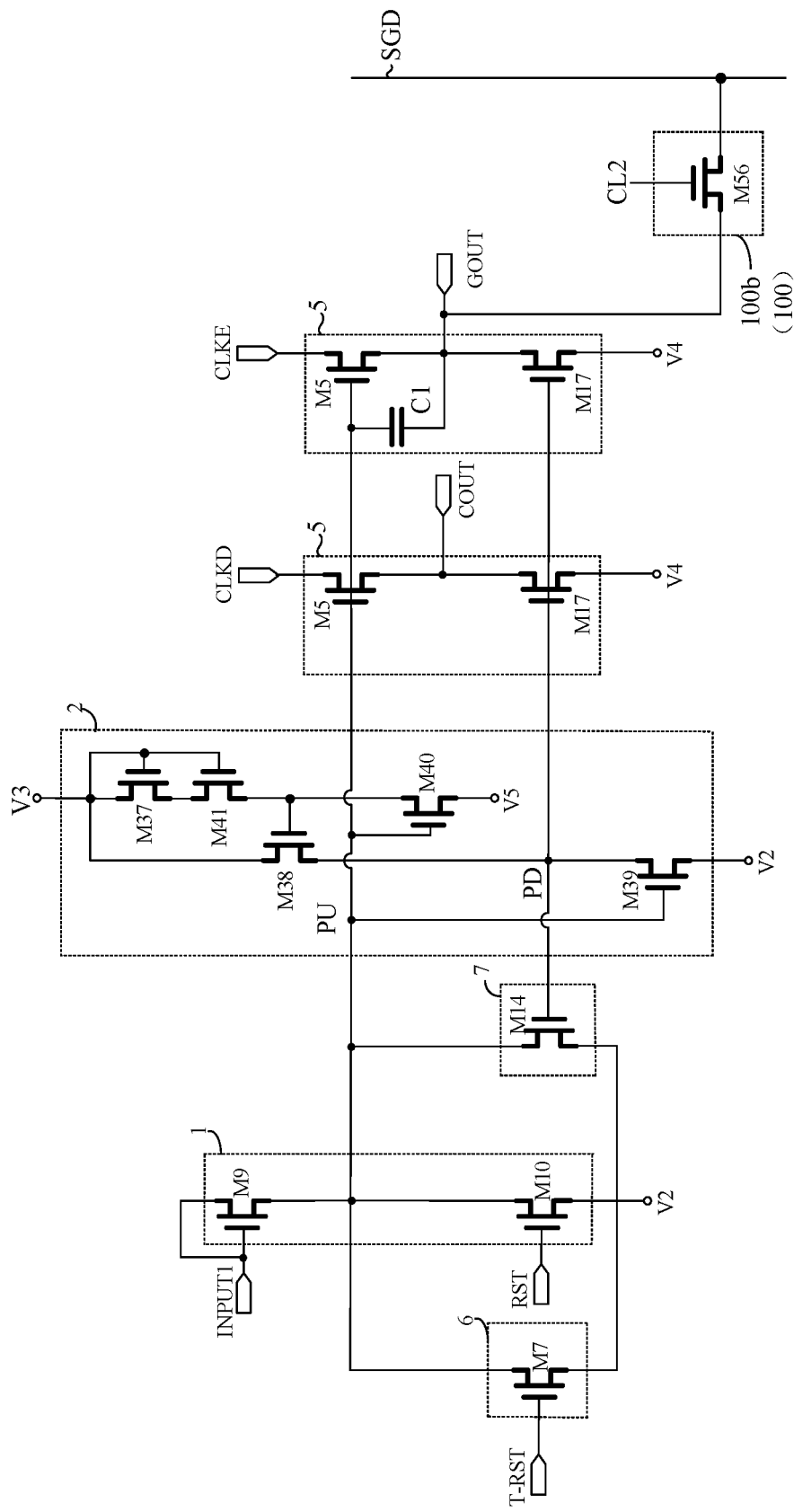
FIG. 17 is a schematic diagram of another circuit structure of a shift register according to embodiments of the present disclosure.

FIG. 17 is a schematic diagram of another circuit structure of a shift register according to embodiments of the present disclosure. As shown in FIG. 17, in some embodiments, the display input reset circuit 1 includes: a display input circuit 1a and a display reset circuit 1b.

The display input circuit 1a is connected to the display signal input terminal INPUT1 and the pull-up node PU, and is configured to write an active level signal to the pull-up node PU in response to a signal provided by the display signal input terminal INPUT1.

The display reset circuit 1b is connected to the display reset signal input terminal RST, the second power supply terminal, and the pull-up node PU, and is configured to write a voltage provided by the second power supply terminal to the pull-up node PU in response to a signal provided by the display reset signal input terminal.

As an example, the display input circuit 1a includes the above ninth transistor M9, and the display reset circuit 1b includes the above tenth transistor M10.

In some embodiments, the shift register further includes: at least one of a pull-up noise reduction circuit 7 and a global reset circuit 6.

The pull-up noise reduction circuit 7 is connected to the second power supply terminal, the pull-up node PU and the pull-down node PD, and is configured to write a voltage provided by the second power supply terminal to the pull-up node PU in response to an active level signal at the pull-down node PD.

The global reset circuit 6 is connected to a global reset signal input terminal T-RST, the second power supply terminal, and the pull-up node PU, and is configured to write a voltage provided by the second power supply terminal to the pull-up node PU in response to a signal provided by the global reset signal input terminal T-RST.

In some embodiments, the pull-up noise reduction circuit 7 includes a fourteenth transistor M14; a control electrode of the fourteenth transistor M14 is connected to the pull-down node PD, a first electrode of the fourteenth transistor M14 is connected to the pull-up node PU, and a second electrode of the fourteenth transistor M14 is connected to the second power supply terminal.

In some embodiments, the global reset circuit 6 includes a seventh transistor M7; a control electrode of the seventh transistor M7 is connected to the global reset signal input terminal T-RST, a first electrode of the seventh transistor M7 is connected to the pull-up node PU, and a second electrode of the seventh transistor M7 is connected to the second power supply terminal.

Figure 18:
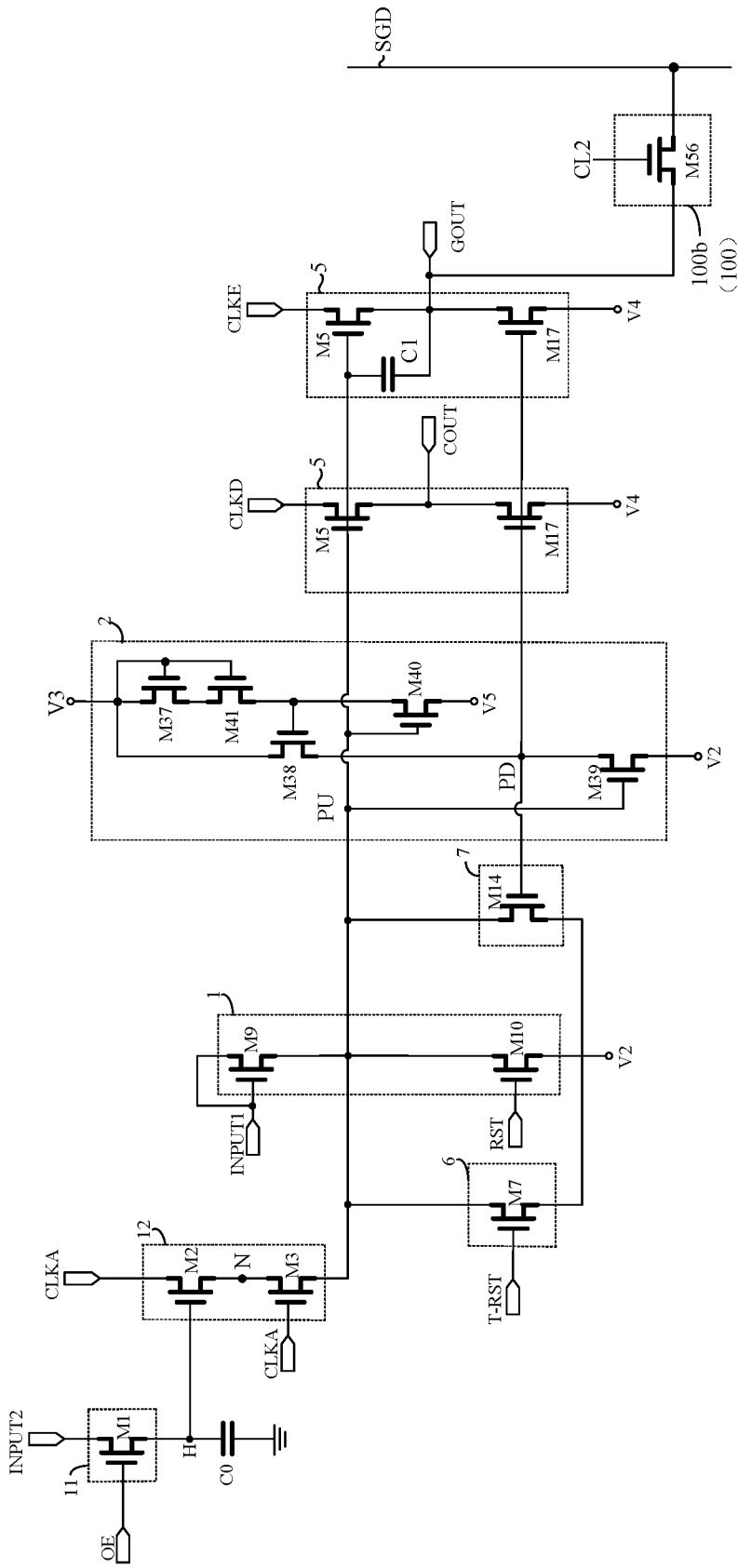
FIG. 18 is a schematic diagram of another circuit structure of a shift register according to embodiments of the present disclosure.
Figure 19:
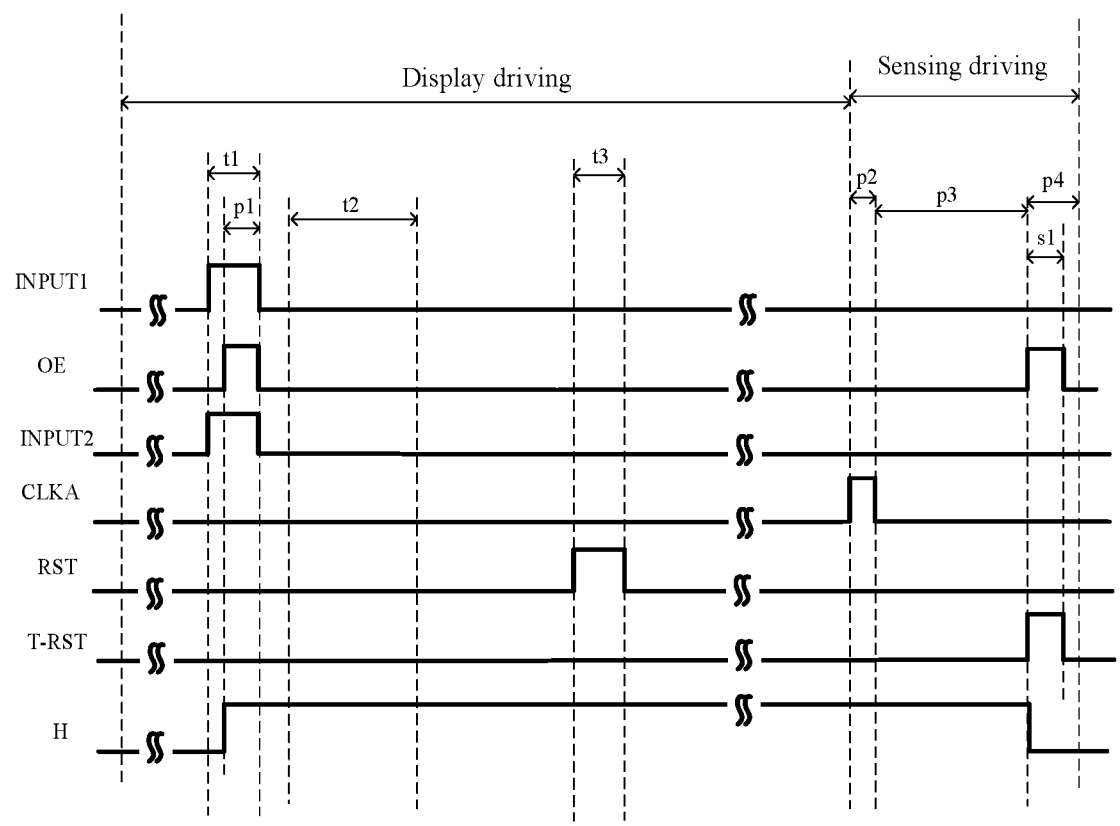
FIG. 19 is a timing diagram illustrating an operation of the shift register shown in FIG. 18 for display driving and sensing driving.

FIG. 18 is a schematic diagram of another circuit structure of a shift register according to embodiments of the present disclosure; FIG. 19 is a timing diagram illustrating an operation of the shift register shown in FIG. 18 for display driving and sensing driving. As shown in FIGS. 18 and 19, unlike the shift register shown in FIG. 17, the shift register shown in FIG. 18 further includes: a sensing control circuit 11 and a sensing input circuit 12.

The sensing control circuit 11 is connected to a sensing control node H, a sensing signal input terminal INPUT2 and a random signal input terminal OE, and is configured to write a signal provided by the sensing signal input terminal INPUT2 to the sensing control node H in response to an active level signal provided by the random signal input terminal OE.

The sensing input circuit 12 is connected to the sensing control node H, a clock control signal input terminal CLKA, a sensing intermediate node N and the pull-up node PU, and configured to write an active level signal to the sensing intermediate node N in response to an active level signal at the sensing control node H and to form a conductive path between the sensing intermediate node N and the pull-up node PU in response to an active level signal provided by the clock control signal input terminal CLKA.

In some embodiments, the sensing control circuit 11 includes a first transistor M1.

A control electrode of the first transistor M1 is connected to the random signal input terminal OE, a first electrode of the first transistor M1 is connected to the sensing signal input terminal INPUT2, and a second electrode of the first transistor M1 is connected to the sensing control node H.

In some embodiments, a holding capacitor C0 is provided at the sensing control node H; a first terminal of the holding capacitor C0 is connected to the sensing control node H, and a second terminal of the holding capacitor C0 is connected to a constant voltage supply terminal, such as ground or a power supply terminal. FIG. 18 illustrates that the second terminal of the holding capacitor is grounded.

In some embodiments, the sensing input circuit 12 includes a second transistor M2 and a third transistor M3.

A control electrode of the second transistor M2 is connected to the sensing control node H, a first electrode of the second transistor M2 is connected to the clock control signal input terminal CLKA, and a second electrode of the second transistor M2 is connected to the sensing intermediate node N.

A control electrode of the third transistor M3 is connected to the clock control signal input terminal CLKA, a first electrode of the third transistor M3 is connected to the sensing intermediate node N, and a second electrode of the third transistor M3 is connected to the pull-up node PU.

Referring to FIG. 19, a display driving and sensing driving process for the shift register specifically includes the following processes: a display driving process, a sensing driving process, and a global reset process s1. The display driving process includes: a display input phase t1, a display output phase t2 and a display reset phase t3; the sensing driving process includes: a sensing preparation phase p1, a sensing input phase p2, a sensing output phase p3, and a sensing control reset phase p4.

Operation states of the transistors in the shift register shown in FIG. 18 at various phases may be inferred by referring to the timing shown in FIG. 19, and the details are not described in detail here.

It should be noted that in the embodiments of the present disclosure, the order of the sensing control reset phase p4 and the global reset phase s1 is not limited in the present disclosure. For example, the sensing control reset phase p4 may be located before the global reset phase s1 (not shown), may be synchronized with the global reset phase s1 (shown in FIG. 13), or may be located after the global reset phase s1 (not shown). In the embodiments of the present disclosure, it is only necessary to ensure that the sensing control reset phase p4 is located after the sensing input phase p2 and the global reset phase s1 is located after the sensing output phase p3.

Figure 20:
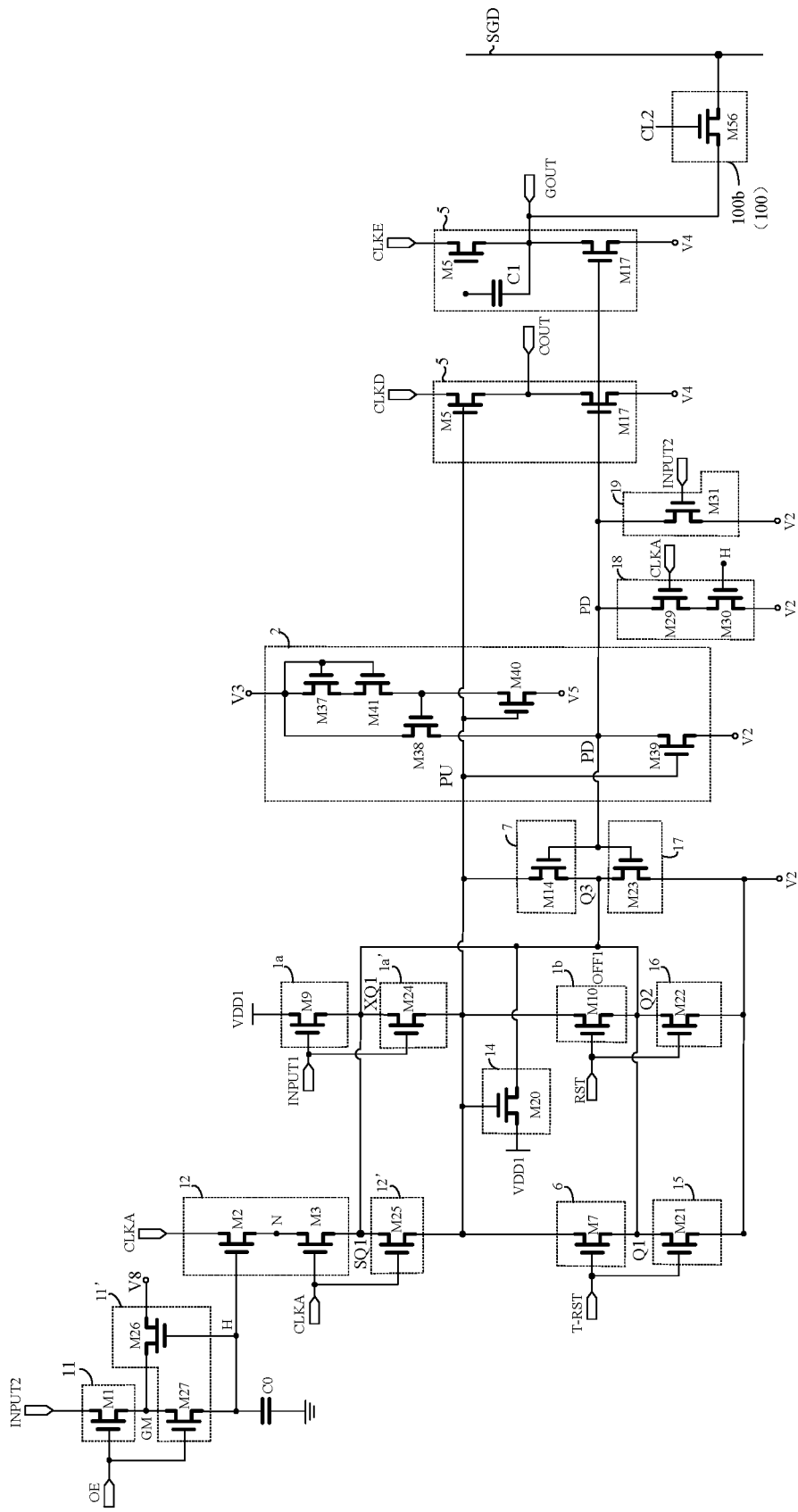
FIG. 20 is a schematic diagram of another circuit structure of a shift register according to embodiments of the present disclosure.

FIG. 20 is a schematic diagram of another circuit structure of a shift register according to embodiments of the present disclosure. As shown in FIG. 20, in some embodiments, the shift register further includes: a first voltage control circuit 14; the first voltage control circuit 14 is connected to a first power supply terminal, the pull-up node PU and a first voltage control node OFF1, and is configured to write a voltage provided by the first power supply terminal to the first voltage control node OFF1 in response to a voltage at the pull-up node PU.

The shift register further includes: at least one of a first leakage preventing circuit 15, a second leakage preventing circuit 16, a third leakage preventing circuit 17 and a display input leakage preventing circuit 1a';

The global reset circuit 6 is connected to the second power supply terminal through the first leakage preventing circuit 15; the global reset circuit 6 is connected to the first leakage preventing circuit 15 at a first leakage preventing node Q1; the first leakage preventing node Q1 is connected to the first voltage control node OFF1; the first leakage preventing circuit 15 is connected to the global reset signal input terminal T-RST, and is configured to form a conductive path between the first leakage preventing node Q1 and the second power supply terminal in response to an active level signal provided by the global reset signal input terminal T-RST, and electrically disconnect the first leakage preventing node Q1 from the second power supply terminal in response to a non-active level signal provided by the global reset signal input terminal T-RST.

The display reset circuit 1b is connected to the second power supply terminal through the second leakage preventing circuit 16; the display reset circuit 1b and the second leakage preventing circuit 16 are connected to each other at a second leakage preventing node Q2; the second leakage preventing node Q2 is connected to the first voltage control node OFF1; the second leakage preventing circuit 16 is connected to the display reset signal input terminal RST, and is configured to form a conductive path between the second leakage preventing node Q2 and the second power supply terminal in response to an active level signal provided by the display reset signal input terminal RST, and to electrically disconnect the second leakage preventing node Q2 from the second power supply terminal in response to a non-active level signal provided by the display reset signal input terminal RST.

The pull-up noise reduction circuit 7 is connected to the second power supply terminal through the third leakage preventing circuit 17; the pull-up noise reduction circuit 7 is connected to the third leakage preventing circuit 17 at a third leakage preventing node Q3; the third leakage preventing node Q3 is connected to the first voltage control node OFF1; the third leakage preventing circuit 17 is connected to the pull-down node PD, and is configured to form a conductive path between the third leakage preventing node Q3 and the second power supply terminal in response to an active level signal of the pull-down node PD, and to electrically disconnect the third leakage preventing node Q3 from the second power supply terminal in response to a non-active level signal of the pull-down node PD.

The display input circuit 1a is connected to the pull-up node PU through the display input leakage preventing circuit 1a'; the display input circuit 1a is connected to the display input leakage preventing circuit 1a' at a display input leakage preventing node XQ1; the display input leakage preventing node XQ1 is connected to the first voltage control node OFF1; the display input leakage preventing circuit 1a' is connected to the display signal input terminal INPUT1, and is configured to form a conductive path between the display input leakage preventing node XQ1 and the pull-up node PU in response to an active level signal provided by the display signal input terminal INPUT1, and to electrically disconnect the display input leakage preventing node XQ1 from the pull-up node PU in response to a non-active level signal provided by the display signal input terminal INPUT1.

In the embodiments of the present disclosure, by providing the first leakage preventing circuit 15, the voltage at the pull-up node PU can be effectively prevented from generating leakage through the global reset circuit 6; by providing the second leakage preventing circuit 16, the voltage at the pull-up node PU can be effectively prevented from generating leakage through the display reset circuit 1b; by providing the third leakage preventing circuit 17, the pull-up node PU can be effectively prevented from generating leakage through the pull-up noise reduction circuit 7; by providing the display input leakage preventing circuit 1a', the pull-up node PU can be effectively prevented from generating leakage through the display input circuit 1a.

FIG. 20 exemplarily illustrates that the shift register includes the first leakage preventing circuit 15, the second leakage preventing circuit 16, the third leakage preventing circuit 17, and the display input leakage preventing circuit 1a', which serves only as an exemplary effect.

In some embodiments, the shift register further includes a sensing input leakage preventing circuit 12'; the sensing input circuit 12 is connected to the pull-up node PU through the sensing input leakage preventing circuit 12', the sensing input circuit 12 and the sensing input leakage preventing circuit 12' are connected to each other at a sensing input leakage preventing node SQ1, the sensing input leakage preventing node SQ1 is connected to the first voltage control node OFF1; the sensing input leakage preventing circuit 12' is connected to the clock control signal input terminal CLKA, and is configured to form a conductive path between the sensing input leakage preventing node SQ1 and the pull-up node PU in response to an active level signal provided by the clock control signal input terminal CLKA, and to electrically disconnect the sensing input leakage preventing node SQ1 from the pull-up node PU in response to a non-active level signal provided by the clock control signal input terminal CLKA.

Referring to FIG. 20, in some embodiments, the first voltage control circuit 14 includes: a twentieth transistor M20; the first leakage preventing circuit 15 includes: a twenty-first transistor M21; the second leakage preventing circuit 16 includes: a twenty-second transistor M22; the third leakage preventing circuit 17 includes: a twenty-third transistor M23; the display input leakage preventing circuit 1a' includes a twenty-fourth transistor M24, and the sensing input leakage preventing circuit 12' includes a twenty-fifth transistor M25.

A control electrode of the twentieth transistor M20 is connected to the pull-up node PU, a first electrode of the twentieth transistor M20 is connected to the first power supply terminal, and a second electrode of the twentieth transistor M20 is connected to the first voltage control node OFF1.

A control electrode of the twenty-first transistor M21 is connected to the global reset signal input terminal T-RST, a first electrode of the twenty-first transistor M21 is connected to the first leakage preventing node Q1, and a second electrode of the twenty-first transistor M21 is connected to the second power supply terminal.

A control electrode of the twenty-second transistor M22 is connected to the display reset signal input terminal RST, a first electrode of the twenty-second transistor M22 is connected to the second leakage preventing node Q2, and a second electrode of the twenty-second transistor M22 is connected to the second power supply terminal.

A control electrode of the twenty-third transistor M23 is connected to the pull-down node PD, a first electrode of the twenty-third transistor M23 is connected to the third leakage preventing node Q3, and a second electrode of the twenty-third transistor M23 is connected to the second power supply terminal.

A control electrode of the twenty-fourth transistor M24 is connected to the display signal input terminal INPUT1, a first electrode of the twenty-fourth transistor M24 is connected to the display input leakage preventing node XQ1, and a second electrode of the twenty-fourth transistor M24 is connected to the pull-up node PU.

A control electrode of the twenty-fifth transistor M25 is connected to the clock control signal input terminal CLKA, a first electrode of the twenty-fifth transistor M25 is connected to the sensing input leakage preventing node SQ1, and a second electrode of the twenty-fifth transistor M25 is connected to the pull-up node PU.

In addition, in the embodiments of the present disclosure, a sensing control leakage preventing circuit 11' may also be provided. The sensing control circuit 11 is connected to the sensing control node H through the sensing control leakage preventing circuit 11', the sensing control leakage preventing circuit 11' and the sensing control circuit 11 are connected to each other at a sensing control leakage preventing node GM; the sensing control leakage preventing circuit 11' is further connected to an eighth power supply terminal, the sensing control node H and the random signal input terminal, and is configured to write an active level signal provided by the eighth power supply terminal to the sensing control leakage preventing node GM in response to an active level signal at the sensing control node H, and is further configured to form a conductive path between the sensing control leakage preventing node GM and the sensing control node H in response to an active level signal provided by the random signal input terminal OE, and to electrically disconnect the sensing control leakage preventing node GM from the sensing control node H in response to a non-active level signal provided by the random signal input terminal OE.

In some embodiments, the sensing control leakage preventing circuit 11' includes a twenty-sixth transistor M26 and a twenty-seventh transistor M27.

A control electrode of the twenty-sixth transistor M26 is connected to the sensing control node H, a first electrode of the twenty-sixth transistor M26 is connected to the first power supply terminal, and a second electrode of the twenty-sixth transistor M26 is connected to the sensing control leakage preventing node GM.

A control electrode of the twenty-seventh transistor M27 is connected to the random signal input terminal OE, a first electrode of the twenty-seventh transistor M27 is connected to the sensing control leakage preventing node GM, and a second electrode of the twenty-seventh transistor M27 is connected to the sensing control node H.

In some embodiments, the shift register unit further includes at least one of a first pull-down noise reduction circuit 18 and a second pull-down noise reduction circuit 19.

The first pull-down noise reduction circuit 18 is connected to the pull-down node PD, the second power supply terminal CLKA, the sensing control node H and the clock control signal input terminal, and is configured to write a non-active level signal provided by the second power supply terminal to the pull-down node PD in response to an active level signal at the sensing control node H and an active level signal provided by the clock control signal input terminal CLKA, so as to perform noise reduction processing on a voltage at the pull-down node PD.

The second pull-down noise reduction circuit 19 is connected to the pull-down node PD, the second power supply terminal, and the sensing signal input terminal INPUT2, and is configured to write a non-active level signal provided by the second power supply terminal to the pull-down node PD in response to an active level signal provided by the sensing signal input terminal INPUT2, so as to perform noise reduction processing on the voltage at the pull-down node PD.

In some embodiments, the first pull-down noise reduction circuit 18 includes a twenty-ninth transistor M29 and a thirtieth transistor M30, and the second pull-down noise reduction circuit 19 includes a thirty-first transistor M31.

A control electrode of the twenty-ninth transistor M29 is connected to the clock control signal input terminal CLKA, a first electrode of the twenty-ninth transistor M29 is connected to the pull-down node PD, and a second electrode of the twenty-ninth transistor M29 is connected to a first electrode of the thirtieth transistor M30.

A control electrode of the thirtieth transistor M30 is connected to the sensing control node H, and a second electrode of the thirtieth transistor M30 is connected to the second power supply terminal.

A control electrode of the thirty-first transistor M31 is connected to the sensing signal input terminal INPUT2, a first electrode of the thirty-first transistor M31 is connected to the pull-down node PD, and a second electrode of the thirty-first transistor M31 is connected to the second power supply terminal.

Figure 21:
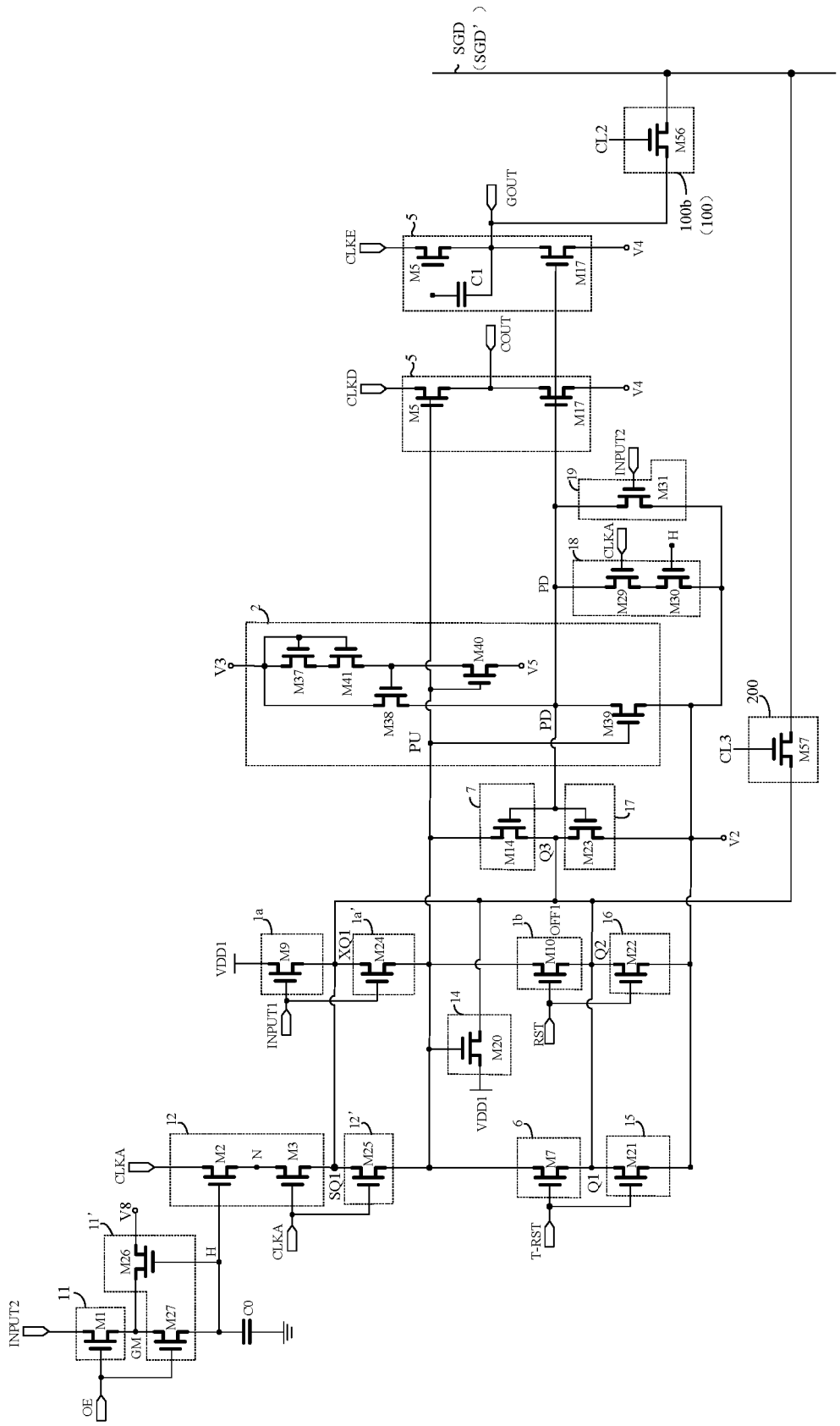
FIG. 21 is a schematic diagram of another circuit structure of a shift register according to embodiments of the present disclosure.

FIG. 21 is a schematic diagram of another circuit structure of a shift register according to embodiments of the present disclosure. As shown in FIG. 21, in some embodiments, when the first voltage control circuit is disposed in the shift register, the shift register may further include a second detection circuit 200; the second detection circuit 200 is connected to the first voltage control node OFF1, a third acquisition control terminal CL3 and a second signal detection line SGD', and is configured to acquire a voltage at the first voltage control node OFF1 in response to a signal provided by the third acquisition control terminal CL3 and output a third detection voltage corresponding to the voltage at the first voltage control node OFF1 to the second signal detection line SGD' for the external first chip to adjust a voltage provided by the first power supply terminal according to the third detection voltage.

When the voltage at the pull-up node PU is at a high level, the corresponding voltage is VPU_H, the eighth power supply terminal provides a voltage V8 greater than or equal to VPU_H, and the voltage at the first voltage control node is VPU_H–Vth_M20, where Vth_M20 is a threshold voltage of the twentieth transistor M20 in the first voltage control circuit, so that a threshold voltage shift of the twentieth transistor M20 may be obtained by reading the voltage at the first voltage control node, and the voltage provided by the first power supply terminal may be adjusted as needed based on the threshold voltage drift of the twentieth transistor M20. How to adjust may be designed in advance as required, and is not described herein again.

In some embodiments, the second detection circuit 200 includes: a fifty-seventh transistor M57; a control electrode of the fifty-seventh transistor M57 is connected to the third acquisition control terminal CL3, a first electrode of the fifty-seventh transistor M57 is connected to the first voltage control node, and a second electrode of the fifty-seventh transistor M57 is connected to the second signal detection line SGD'.

To effectively reduce wiring, in some embodiments, the first signal detection line SGD is multiplexed as the second signal detection line SGD'. That is, the first signal detection line SGD may receive the signals provided by the first and second detection circuits 100 and 200 in a time division multiplexing manner.

Alternatively, in some embodiments, the shift register may include only the second detection circuit 200 and not include the first detection circuit 100, which also belongs to the protection scope of the present disclosure.

It should be noted that in the above embodiments, different parts in different embodiments may be combined with each other, and such new technical solutions obtained by combining the embodiments should also belong to the protection scope of the present disclosure.

Based on the same inventive concept, the embodiments of the present disclosure further provide a gate driving circuit, including: a plurality of cascaded shift registers, at least one of the shift registers employs the shift register as provided in the foregoing embodiments; and for a specific description, reference may be made to the contents in the foregoing embodiments, and details are not repeated here.

Figure 22:
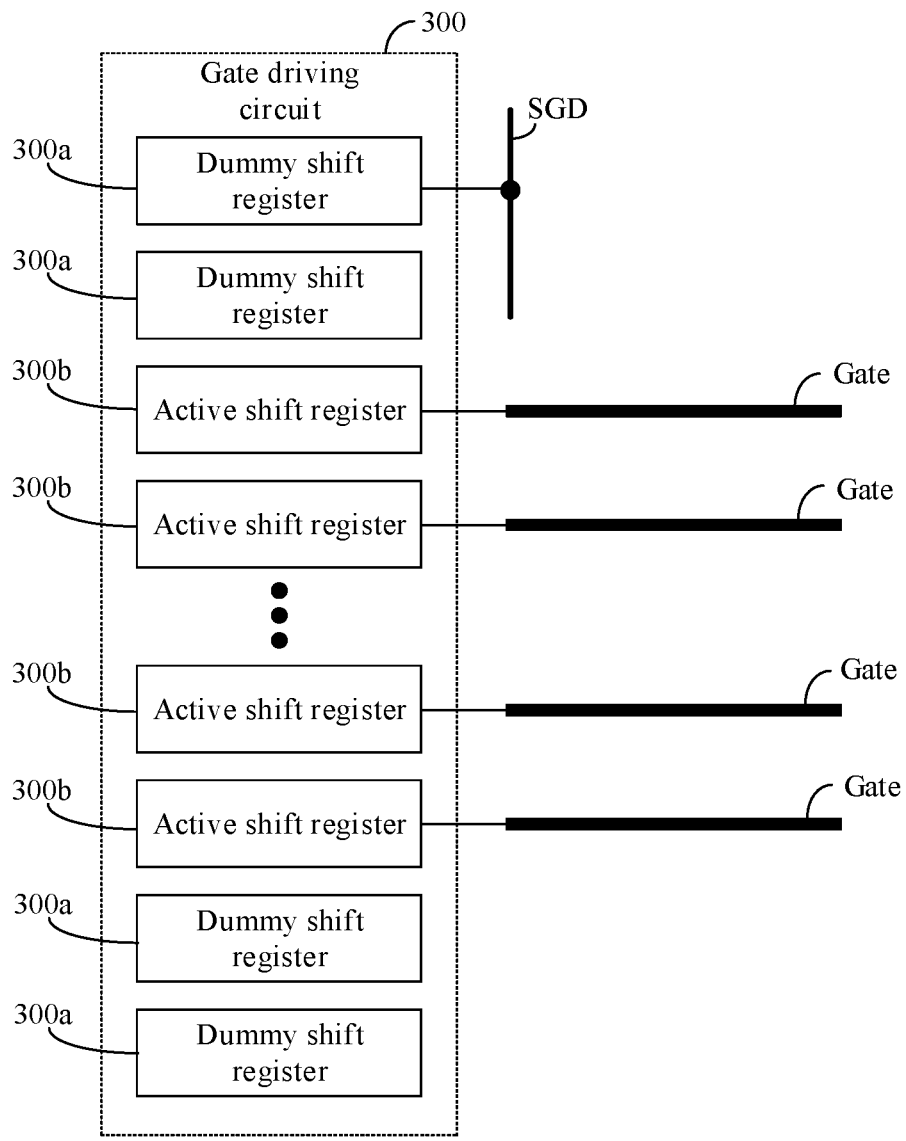
FIG. 22 is a schematic diagram of a circuit structure of a gate driving circuit according to embodiments of the present disclosure.

FIG. 22 is a schematic diagram of a circuit structure of a gate driving circuit according to embodiments of the present disclosure. As shown in FIG. 22, the plurality of shift registers included in the gate driving circuit specifically include: a plurality of active shift registers 300b for providing driving signals to gate lines Gate located in the display region, and at least one dummy shift register other than the active shift registers 300b; at least one dummy shift register 300a adopts the shift register provided in the previous embodiments; that is, the first detection circuit 100 is provided in at least one dummy shift register 300a.

In practical applications, generally, the shift registers in the first two stages or the last two stages in the gate driving circuit are the dummy shift registers 300a, and the shift registers in the third stage to the third last stage are the active shift registers 300b.

In the present disclosure, the first detection circuit 100 may be provided in any one of the dummy shift registers 300a. Alternatively, the first detection circuit 100 (in which the first signal detection line SGD is provided) may be provided in any one of the dummy shift registers 300a, which is not limited in the present disclosure.

Figure 23:
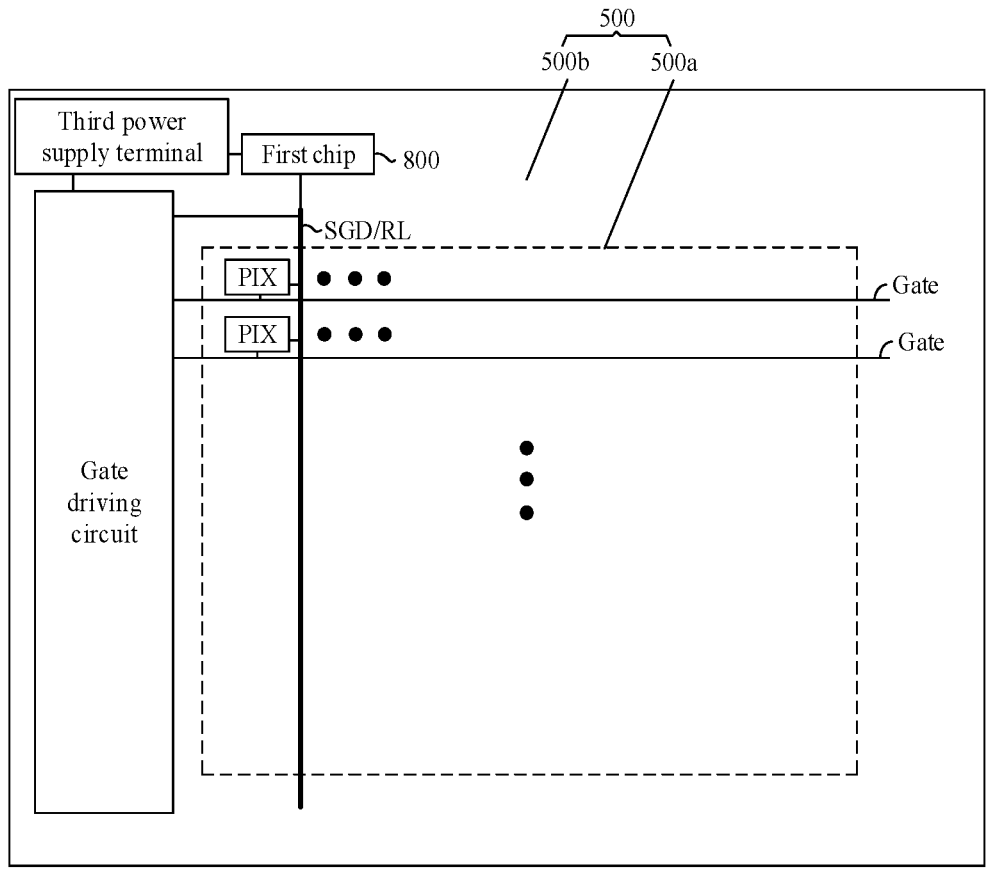
FIG. 23 is a schematic diagram of one structure of a display apparatus according to embodiments of the present disclosure.
Figure 24:
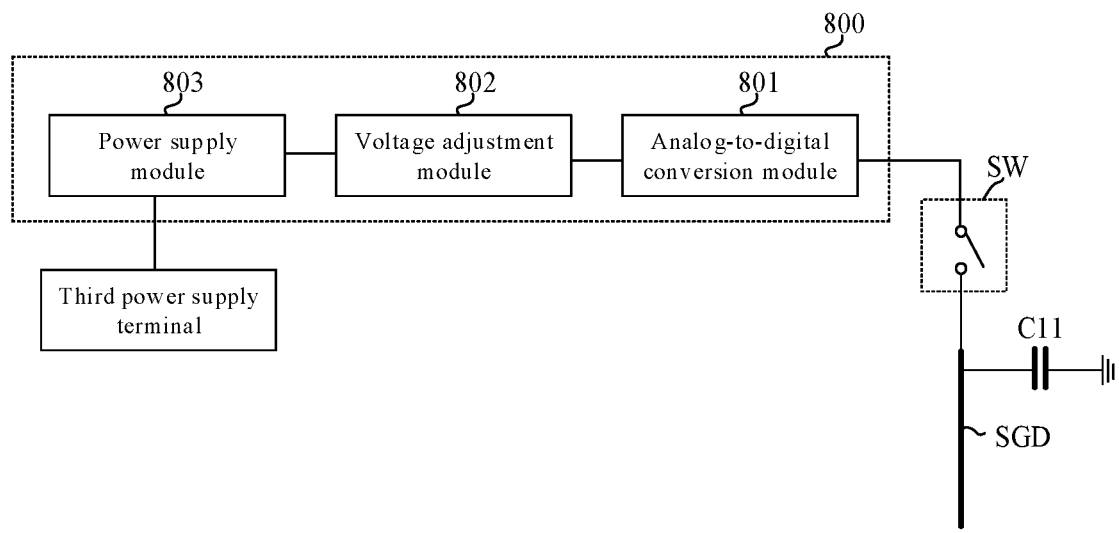
FIG. 24 is a block diagram of a structure of a first chip according to embodiments of the present disclosure.

Based on the same inventive concept, the embodiments of the present disclosure further provide a display apparatus. FIG. 23 is a schematic diagram of one structure of a display apparatus according to the embodiments of the present disclosure; and FIG. 24 is a block diagram of a structure of a first chip according to embodiments of the present disclosure. As shown in FIGS. 23 and 24, the display apparatus 500 includes: a display region 500a and a non-display region 500b surrounding the display region 500a, the gate driving circuit is disposed in the non-display region 500b, and the gate driving circuit is the gate driving circuit provided in the foregoing embodiments. For the specific details, reference may be made to the content in the foregoing embodiments, which is not described here again.

In some embodiments, the display apparatus 500 further includes: a plurality of pixel units PIX arranged in an array and a plurality of signal reading lines. Referring again to FIG. 1, in some embodiments, each pixel unit PIX includes: a pixel driving circuit having an external threshold compensation function; the pixel driving circuit includes: a driving transistor DTFT and a sensing switch circuit STFT; the sensing switch circuit STFT is connected to a second electrode of the driving transistor DTFT and a corresponding signal reading line RL, and is configured to read an electrical signal at the second electrode of the driving transistor DTFT to the corresponding signal reading line RL, so that an external second chip (not shown) performs external threshold compensation on the driving transistor DTFT according to the electrical signal at the second electrode of the driving transistor DTFT.

In some embodiments, at least one signal reading line RL is multiplexed as the first signal detection line SGD. By the design, the number of wires in the display apparatus can be effectively reduced, and the product structure is simplified.

In some embodiments, the second chip is the same chip as the first chip 800.

In some embodiments, only one shift register in the gate driving circuit is provided with the first detection circuit 100; one signal reading line RL closest to the gate driving circuit in the display apparatus is multiplexed as the first signal detection line SGD.

In some embodiments, the first chip 800 is further configured to control a voltage provided by the third power supply terminal to be switched from an active level voltage to a non-active level voltage in response to the display apparatus being switched to being in an OFF state. When the display apparatus is switched to being in an OFF state, the voltage provided by the third power supply terminal may be controlled to be switched from the active level voltage to the non-active level voltage, which eliminates the forward stress of the transistor in the inverter circuit 2 having a control electrode connected to the third power supply terminal, and favorably solves the problem of the forward drift of the transistor in the inverter circuit 2 having the control electrode connected to the third power supply terminal.

In some embodiments, the first chip 800 includes: an analog-to-digital conversion module 801 and a voltage adjustment module 802; the analog-to-digital conversion module 801 is connected to the first signal detection line SGD, and is configured to perform an analog-to-digital conversion processing on a signal acquired from the first signal detection line SGD to obtain a corresponding digital voltage; the voltage adjustment module 802 is connected to the analog-to-digital conversion module 801, and is configured to obtain a magnitude of an active level voltage to be provided to the third power supply terminal according to a preset adjustment algorithm and the digital voltage provided by the analog-to-digital conversion module 801.

In some embodiments, the first chip 800 further includes: a power supply module 803; the power supply module 803 is connected to the voltage adjustment module, and is configured to output a corresponding active level voltage to the third power supply terminal according to the magnitude of the active level voltage to be provided to the third power supply terminal determined by the voltage adjustment module 802.

In some embodiments, a switch circuit SW is disposed between the first chip 800 and the first signal detection line SGD.

In some embodiments, the first signal detection line SGD is further configured with an eleventh capacitor C11; a first terminal of the eleventh capacitor C11 is connected to the first signal detection line SGD, and a second terminal of the eleventh capacitor C11 is connected to the ground terminal.

It should be noted that one signal reading line RL closest to the gate driving circuit in the display apparatus is multiplexed as the first signal detection line SGD as above, which is only an optional implementation in the present disclosure, and does not limit the disclosed technical solution. In the present disclosure, one or more signal reading lines RL may be randomly selected and multiplexed as the first signal detection line SGD, or the first signal detection line SGD may be separately provided in the display apparatus, which all belong to the protection scope of the present disclosure.

The display apparatus provided by the embodiments of the present disclosure may be: any product or component with a display function, such as an OLED display panel, a wearable device, a mobile phone, a tablet, a television, a display, a notebook computer, a digital photo frame, a navigator or the like. Other essential components of the display apparatus are understood by one of ordinary skill in the art to exist, and are not described herein and should not be used to limit the present disclosure.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A shift register, comprising: a display input reset circuit, an inverter circuit, at least one output circuit and a first detection circuit, wherein the display input reset circuit, the inverter circuit and the at least one output circuit are connected to a pull-up node, and the inverter circuit and the at least one output circuit are connected to a pull-down node;
the display input reset circuit is connected to a display signal input terminal, a reset signal terminal and a second power supply terminal, and is configured to write an active level signal to the pull-up node in response to a signal provided by the display signal input terminal and to write a voltage provided by the second power supply terminal to the pull-up node in response to a signal provided by the reset signal terminal;
the inverter circuit is connected to the second power supply terminal and a third power supply terminal, and is configured to invert a voltage at the pull-up node in response to a voltage provided by the second power supply terminal and an active level voltage provided by the third power supply terminal to obtain an inverted voltage, and output the inverted voltage to the pull-down node;
the at least one output circuit is connected to the pull-up node, the pull-down node, a corresponding signal output terminal, a corresponding output clock signal terminal, and a corresponding fourth power supply terminal, and is configured to write a signal provided by the output clock signal terminal to the corresponding signal output terminal in response to the voltage at the pull-up node, and write a voltage provided by the corresponding fourth power supply terminal to the corresponding signal output terminal in response to the voltage at the pull-up node; and
the first detection circuit is connected to a signal acquisition point, an acquisition control terminal, and a first signal detection line, and is configured to acquire a voltage at the signal acquisition point in response to a signal provided by the acquisition control terminal and output a detection voltage corresponding to the voltage at the signal acquisition point to the first signal detection line, so that an external first chip adjusts an active level voltage provided by the third power supply terminal according to the detection voltage; and the signal acquisition point comprises one of the pull-down node and the signal output terminal, or comprises both the pull-down node and the signal output terminal;
wherein the first detection circuit comprises: at least one of a first detection sub-circuit and a second detection sub-circuit, the acquisition control terminal comprises: a first acquisition control terminal or a second acquisition control terminal;
the first detection sub-circuit is connected to the pull-down node, the first acquisition control terminal, and the first signal detection line, and is configured to acquire a voltage at the pull-down node in response to a signal provided by the first acquisition control terminal, and output a first detection voltage corresponding to the voltage at the pull-down node to the first signal detection line; and the second detection sub-circuit is connected to the signal output terminal, the second acquisition control terminal, and the first signal detection line, and is configured to acquire a voltage at the pull-down node in response to a signal provided by the second acquisition control terminal, and output a second detection voltage corresponding to the voltage at the signal output terminal to the first signal detection line.

2. The shift register of claim 1, wherein the first detection sub-circuit comprises: a fifty-first transistor; and a control electrode of the fifty-first transistor is connected to the first acquisition control terminal, a first electrode of the fifty-first transistor is connected to the pull-down node, and a second electrode of the fifty-first transistor is connected to the first signal detection line; and each second detection sub-circuit comprises: a fifty-sixth transistor; and a control electrode of the fifty-sixth transistor is connected to a corresponding second acquisition control terminal, a first electrode of the fifty-sixth transistor is connected to a corresponding signal output terminal, and a second electrode of the fifty-sixth transistor is connected to the first signal detection line.

3. The shift register of claim 1, wherein the first detection sub-circuit comprises: a fifty-first transistor, a fifty-second transistor, a fifty-third transistor, and a fifty-fourth transistor;

a control electrode of the fifty-first transistor is connected to the first acquisition control terminal, a first electrode of the fifty-first transistor is connected to a second electrode of the fifty-second transistor, and a second electrode of the fifty-first transistor is connected to the first signal detection line;

a control electrode of the fifty-second transistor is connected to the pull-down node, and a first electrode of the fifty-second transistor is connected to a second electrode of the fifty-third transistor and a first electrode of the fifty-fourth transistor;

a control electrode of the fifty-third transistor is connected to a first switch control terminal, and a first electrode of the fifty-third transistor is connected to the control electrode of the fifty-second transistor; and a control electrode of the fifty-fourth transistor is connected to a second switch control terminal, and a second electrode of the fifty-fourth transistor is connected to a seventh power supply terminal; and each second detection sub-circuit comprises: a fifty-sixth transistor; and a control electrode of the fifty-sixth transistor is connected to a corresponding second acquisition control terminal, a first electrode of the fifty-sixth transistor is connected to a corresponding signal output terminal, and a second electrode of the fifty-sixth transistor is connected to the first signal detection line.

4. The shift register of claim 3, wherein the first detection sub-circuit further comprises: a fifty-fifth transistor;

the second electrode of the fifty-second transistor is connected to the first electrode of the fifty-first transistor through the fifty-fifth transistor, a control electrode and a first electrode of the fifty-fifth transistor are both connected to the second electrode of the fifty-second transistor, and a second electrode of the fifty-fifth transistor is connected to the first electrode of the fifty-first transistor; or the second electrode of the fifty-first transistor is connected to the first signal detection line through the fifty-fifth transistor, a control electrode and a first electrode of the fifty-fifth transistor are both connected to the second electrode of the fifty-first transistor, and the second electrode of the fifty-fifth transistor is connected to the first signal detection line.

5. The shift register of claim 1, wherein the at least one output circuit comprises m output circuits, the first detection circuit comprises n second detection sub-circuits, the acquisition control terminal comprises n second acquisition control terminals, the second detection sub-circuits are in one-to-one correspondence with the second acquisition control terminals, m and n are positive integers, and m≠n; and different second detection sub-circuits correspond to different output circuits, and the second detection sub-circuits are connected to the signal output terminals of the corresponding output circuits.

6. The shift register of claim 1, further comprising: a voltage-reducing circuit; and the first detection circuit is connected to the first signal detection line through the voltage-reducing circuit, and the voltage-reducing circuit is configured to perform a voltage-reducing processing on the detection voltage output from the first detection circuit and output the detection voltage subjected to the voltage-reducing processing to the first signal detection line.

7. The shift register of claim 6, wherein the voltage-reducing circuit comprises: a first resistor and a second resistor; and a first terminal of the first resistor is connected to the first detection circuit, a second terminal of the first resistor is connected to the first signal detection line, a first terminal of the second resistor is connected to the second terminal of the first resistor, and a second terminal of the second resistor is connected to a ground terminal.

8. The shift register of claim 1, wherein the display input reset circuit comprises:

a display input circuit connected to the display signal input terminal and the pull-up node, and configured to write an active level signal to the pull-up node in response to a signal provided by the display signal input terminal;

a display reset circuit connected to a display reset signal input terminal, the second power supply terminal and the pull-up node, and configured to write a voltage provided by the second power supply terminal to the pull-up node in response to a signal provided by the display reset signal input terminal;

the shift register further comprises: a first voltage control circuit;

the first voltage control circuit is connected to a first power supply terminal, the pull-up node and a first voltage control node, and is configured to write a voltage provided by the first power supply terminal to the first voltage control node in response to the voltage at the pull-up node;

the shift register further comprises: at least one of a second leakage preventing circuit and a display input leakage preventing circuit;

the display reset circuit is connected to the second power supply terminal through the second leakage preventing circuit; the display reset circuit and the second leakage preventing circuit are connected to each other at a second leakage preventing node; the second leakage preventing node is connected to the first voltage control node; the second leakage preventing circuit is connected to the display reset signal input terminal, and is configured to form a conductive path between the second leakage preventing node and the second power supply terminal in response to an active level signal provided by the display reset signal input terminal, and to electrically disconnect the second leakage preventing node from the second power supply terminal in response to a non-active level signal provided by the display reset signal input terminal; and the display input circuit is connected to the pull-up node through the display input leakage preventing circuit; the display input circuit is connected to the display input leakage preventing circuit at a display input leakage preventing node; the display input leakage preventing node is connected to the first voltage control node; the display input leakage preventing circuit is connected to the display signal input terminal, and is configured to form a conductive path between the display input leakage preventing node and the pull-up node in response to an active level signal provided by the display signal input terminal, and to electrically disconnect the display input leakage preventing node from the pull-up node in response to a non-active level signal provided by the display signal input terminal.

9. The shift register of claim 8, further comprising:
a second detection circuit connected to the first voltage control node, a third acquisition control terminal and a second signal detection line, and configured to acquire a voltage at the first voltage control node in response to a signal provided by the third acquisition control terminal and output a third detection voltage corresponding to the voltage at the first voltage control node to the second signal detection line for the external first chip to adjust a voltage provided by the first power supply terminal according to the third detection voltage; and the second detection circuit comprises: a fifty-seventh transistor; and a control electrode of the fifty-seventh transistor is connected to the third acquisition control terminal, a first electrode of the fifty-seventh transistor is connected to the first voltage control node, and a second electrode of the fifty-seventh transistor is connected to the second signal detection line.

10. The shift register of claim 1, wherein the shift register further comprises: at least one of a pull-up noise reduction circuit and a global reset circuit;

the pull-up noise reduction circuit is connected to the second power supply terminal, the pull-up node and the pull-down node, and is configured to write a voltage provided by the second power supply terminal to the pull-up node in response to an active level signal at the pull-down node; and the global reset circuit is connected to a global reset signal input terminal, the second power supply terminal and the pull-up node, and is configured to write a voltage provided by the second power supply terminal to the pull-up node in response to a signal provided by the global reset signal input terminal.

11. The shift register of claim 10, further comprising: a first voltage control circuit;
the first voltage control circuit is connected to the first power supply terminal, the pull-up node and the first voltage control node, and is configured to write a voltage provided by the first power supply terminal to the first voltage control node in response to a voltage at the pull-up node and;

the shift register circuit further comprises: at least one of a first leakage preventing circuit and a third leakage preventing circuit;

the global reset circuit is connected to the second power supply terminal through the first leakage preventing circuit; the global reset circuit is connected to the first leakage preventing circuit at a first leakage preventing node; the first leakage preventing node is connected to the first voltage control node; the first leakage preventing circuit is connected to the global reset signal input terminal, and is configured to form a conductive path between the first leakage preventing node and the second power supply terminal in response to an active level signal provided by the global reset signal input terminal, and electrically disconnect the first leakage preventing node from the second power supply terminal in response to a non-active level signal provided by the global reset signal input terminal; and the pull-up noise reduction circuit is connected to the second power supply terminal through the third leakage preventing circuit; the pull-up noise reduction circuit is connected to the third leakage preventing circuit at a third leakage preventing node; the third leakage preventing node is connected to the first voltage control node; the third leakage preventing circuit is connected to the pull-down node, and is configured to form a conductive path between the third leakage preventing node and the second power supply terminal in response to an active level signal at the pull-down node, and to electrically disconnect the third leakage preventing node from the second power supply terminal in response to a non-active level signal at the pull-down node.

12. The shift register of claim 1, wherein the inverter circuit comprises: a thirty-seventh transistor, a thirty-eighth transistor, a thirty-ninth transistor, and a fortieth transistor;

a control electrode of the thirty-seventh transistor is connected to the third power supply terminal, a first electrode of the thirty-seventh transistor is connected to the control electrode of the thirty-seventh transistor, and a second electrode of the thirty-seventh transistor is connected to a control electrode of the thirty-eighth transistor;

the control electrode of the thirty-eighth transistor is connected to a first electrode of the fortieth transistor, a first electrode of the thirty-eighth transistor is connected to the third power supply terminal, and a second electrode of the thirty-eighth transistor is connected to the pull-down node;

a control electrode of the thirty-ninth transistor is connected to the pull-up node, a first electrode of the thirty-ninth transistor is connected to the pull-down node, and a second electrode of the thirty-ninth transistor is connected to the second power supply terminal; and a control electrode of the fortieth transistor is connected to the pull-up node, and a second electrode of the fortieth transistor is connected to a fifth power supply terminal or the pull-down node.

13. The shift register of claim 12, wherein the inverter circuit further comprises:

a forty-first transistor; the second electrode of the thirty-seventh transistor is connected to the control electrode of the thirty-eighth transistor through the forty-first transistor; and a control electrode of the forty-first transistor is connected to the control electrode of the thirty-seventh transistor, a first electrode of the forty-first transistor is connected to the second electrode of the thirty-seventh transistor, and a second electrode of the forty-first transistor is connected to the control electrode of the thirty-eighth transistor.

14. The shift register of claim 1, wherein the inverter circuit comprises: a twelfth transistor and a thirteenth transistor;

a control electrode of the twelfth transistor is connected to the third power supply terminal, a first electrode of the twelfth transistor is connected to the control electrode of the twelfth transistor, and a second electrode of the twelfth transistor is connected to the pull-down node; and a control electrode of the thirteenth transistor is connected to the pull-up node, a first electrode of the thirteenth transistor is connected to the pull-down node, and a second electrode of the thirteenth transistor is connected to the second power supply terminal.

15. The shift register of claim 1, further comprising:

a sensing control circuit connected to a sensing control node, a sensing signal input terminal and a random signal input terminal, and configured to write a signal provided by the sensing signal input terminal to the sensing control node in response to a signal provided by the random signal input terminal; and a sensing input circuit connected to the sensing control node, a clock control signal input terminal, a sensing intermediate node and the pull-up node, and configured to write an active level signal to the sensing intermediate node in response to an active level signal at the sensing control node and to form a conductive path between the sensing intermediate node and the pull-up node in response to a signal provided by the clock control signal input terminal.

16. A gate driving circuit, comprising: a plurality of cascaded shift registers, wherein the plurality of cascaded shift registers comprises: a plurality of active shift registers for providing driving signals to gate lines in a display region and at least one dummy shift register other than the plurality of active shift registers; and each of the at least one dummy shift register is a shift register of claim 1.

17. A display apparatus, comprising: a display region and a non-display region surrounding the display region, wherein the non-display region is provided with a gate driving circuit therein, wherein the gate driving circuit comprises a plurality of cascaded shift registers, the plurality of cascaded shift registers comprises: a plurality of active shift registers for providing driving signals to gate lines in a display region and at least one dummy shift register other than the plurality of active shift registers; and each of the at least one dummy shift register is a shift register of claim 1.

18. The display apparatus of claim 17, further comprising: a plurality of pixel units arranged in an array and a plurality of signal reading lines; wherein each pixel unit of the plurality of pixel units comprises: a pixel driving circuit having an external threshold compensation function; and the pixel driving circuit comprises: a driving transistor and a sensing switch circuit;

wherein the sensing switch circuit is connected to a second electrode of the driving transistor and a corresponding signal reading line, and is configured to read an electrical signal at the second electrode of the driving transistor to the corresponding signal reading line, so that an external second chip performs an external threshold compensation processing on the driving transistor according to the electrical signal at the second electrode of the driving transistor; and at least one signal reading line is multiplexed as the first signal detection line.

19. The display apparatus of claim 18, wherein only one shift register in the gate driving circuit is provided with the first detection circuit; and one signal reading line closest to the gate driving circuit in the display apparatus is multiplexed as the first signal detection line.

20. The display apparatus of claim 17, wherein the first chip is further configured to control a voltage provided by the third power supply terminal to be switched from an active level voltage to a non-active level voltage in response to the display apparatus being switched to being in an OFF state.

* * * * *